United States Patent [19]
Hirunuma et al.

[11] Patent Number: 6,057,962
[45] Date of Patent: *May 2, 2000

[54] OBSERVATION OPTICAL SYSTEM HAVING HAND-VIBRATION COMPENSATION SYSTEM

[75] Inventors: Ken Hirunuma, Tokyo; Shinji Tsukamoto; Tetsuo Sekiguchi, both of Saitama-ken; Moriyasu Kanai, Tokyo, all of Japan

[73] Assignee: Asahi Kogaku Kogyo Kabushiki Kaisha, Tokyo, Japan

[*] Notice: This patent is subject to a terminal disclaimer.

[21] Appl. No.: 09/203,522

[22] Filed: Dec. 1, 1998

[30] Foreign Application Priority Data

Dec. 2, 1997 [JP] Japan .................................... 9-331659

[51] Int. Cl.[7] ............................. G02B 27/64; G02B 23/00
[52] U.S. Cl. .......................... 359/557; 359/407; 359/554
[58] Field of Search ................................... 359/407–420, 359/480–482, 431, 554–557, 813–814, 823–824, 831–837; 396/52–56; 348/208

[56] References Cited

U.S. PATENT DOCUMENTS

| | | | |
|---|---|---|---|
| 4,013,339 | 3/1977 | Ando et al. ............................... | 359/556 |
| 5,231,534 | 7/1993 | Kato ........................................ | 359/432 |
| 5,280,387 | 1/1994 | Maruyama ............................... | 359/554 |
| 5,387,999 | 2/1995 | Hayashi ................................... | 359/557 |
| 5,461,513 | 10/1995 | Maruyama ............................... | 359/837 |
| 5,754,339 | 5/1998 | Kanai et al. ............................. | 359/557 |
| 5,768,016 | 6/1998 | Kanbara ................................... | 359/557 |
| 5,917,653 | 6/1999 | Taniguchi ................................ | 359/557 |

FOREIGN PATENT DOCUMENTS

| | | |
|---|---|---|
| 2-81009 | 3/1990 | Japan . |
| 2284113 | 11/1990 | Japan . |
| 3237438 | 10/1991 | Japan . |
| 6-43365 | 2/1994 | Japan . |
| 7248522 | 9/1995 | Japan . |
| 7311368 | 11/1995 | Japan . |

*Primary Examiner*—Thong Nguyen
*Attorney, Agent, or Firm*—Greenblum & Bernstein P.L.C.

[57] ABSTRACT

Disclosed is an observation optical system such as a binocular. A telescopic optical system of the observation optical system is provided with a plurality of optical elements, which are arranged such that the observation optical system has a first optical axis horizontally extending and a second optical axis vertically extending when the binocular is held horizontally by a user. The observation optical system is further provided with first and second compensation optical systems that are movable to shift optical paths of light passed through the first and second compensation optical systems to compensate trembling of image due to hand vibration applied to the observation optical system. The compensation optical systems are constituted and arranged such that movement thereof will not be affected by the gravity.

21 Claims, 13 Drawing Sheets

OBSERVATION OPTICAL SYSTEM HAVING HAND-VIBRATION COMPENSATION SYSTEM

BACKGROUND OF THE INVENTION

The present invention relates to an observation optical system, such as a binocular, a monocular or the like, provided with a hand-vibration compensation system.

Recently, observation optical systems provided with hand-vibration compensation systems for compensating trembling of image due to the hand-vibration have been developed. One example of the hand-vibration compensation system for a binocular is constructed such that a hand-vibration compensation optical system including compensation lenses is provided within an optical path of each of a pair of telescopic optical systems of the binocular. Such compensation lenses are moved in a direction perpendicular to the optical axis of each telescopic optical system. Specifically, in such a type of the compensation system, two compensation mechanisms are generally provided, which are:

(1) a mechanism for moving the compensation lenses in a vertical direction; and (2) a mechanism for moving compensation lenses, which are also provided within the optical paths of the telescopic optical systems, in a horizontal direction.

For the mechanism which moves the lenses in the vertical direction, it is necessary to change a response speed and/or voltage or electrical current for an actuator, depending on whether the lenses are moved in a direction of the gravity or in the opposite direction. In other words, controlling of the mechanism for moving the lenses should be changed when the lenses are moved in the vertical direction, and accordingly controlling is relatively complicated. Further, such a mechanism is required to have a driving device which has a relatively large torque in order to move the structure with resisting the gravity, and a relatively large battery for supplying sufficient power to such a driving device. Therefore, the conventional compensation mechanism becomes relatively large.

As a hand-vibration compensation device for a camera, which prevents blur of image on a film due to the hand-vibration, there has been known a device in which the compensation optical system is driven-along two different axes each of which does not coincide with a direction of the gravity. However, the optical system of the camera is generally designed with reference to sides of a picture frame, i.e., the vertical and horizontal directions, and therefore, it is not preferable to drive the compensation lenses in the directions which do not coincides with two sides of the picture frame of the camera, especially when compensation characteristics is to be changed in accordance with panning and/or tilting of the camera, and control thereof is also complicated.

With use of a variable angle prism, it is possible to avoid affection of the gravity. However, producing the appropriate variable angle prism is very difficult and expensive, and further, controlling of such a compensation mechanism is relatively difficult.

SUMMARY OF THE INVENTION

It is therefore an object of the present invention to provide an observation optical system provided with a hand-vibration compensation system which is free from affection of the gravity, and is capable of compensating trembling of an image due to the hand-vibration both in the vertical and horizontal directions with a relatively simple structure and control.

For the above object, according to the present invention, there is provided an observation optical system which is provided with at least one telescopic optical system having a plurality of optical elements, the plurality of optical elements being arranged such that the observation optical system has a horizontally extending first optical axis and a vertically extending second optical axis when the observing optical system is held horizontally by a user; a first compensation optical system that is moved to shift an optical path of light passed through the first compensatin optical system to compensate trembling of image due to hand vibration applied to the observation optical system in a horizontal direction when the observation optical system is held horizontally; and a second compensation optical system that is moved to shift an optical path of light passed through the second compenation optical system to compensate trembling of image due to hand vibration applied to the observation optical system in a vertical direction when the observation optical system is held horizontally. The first compensation optical system is arranged such that the first optical axis intersects the first compensation optical system, and the second compensation optical system is arranged such that the second optical axis intersects the second compensation optical system. In this case, the second compensation optical system is constituted to include a rotatable member which is rotatable about an axis extending parallel to the second optical axis, the rotatable member being equally balanced at the axis.

According to another aspect of the invention, there is provided an observation optical system, which is provided with: at least one telescopic optical system having a plurality of optical elements, the plurality of optical elements being arranged such that the observation optical system has a horizontally extending first optical axis and a vertically extending second optical axis when the observing optical system is held horizontally by a user; a first compensation optical system that is moved to shift an optical path of light passed through the first compensation optical system to compensate trembling of image due to hand vibration applied to the observation optical system in a horizontal direction when the observation optical system is held horizontally; and a second compensation optical system that is moved to shift an optical path of light passed through the second compensation optical system to compensate trembling of image due to hand vibration applied to the observation optical system in a vertical direction when the observation optical system is held horizontally. The second compensation optical system is arranged to shift an optical path of light traveling along the first optical axis, and the first compensation optical system being arranged to shift an optical path of light traveling along the second optical axis. In this case, the first compensation optical system is movable in a direction perpendicular to both of the first and the second optical axis.

According to further aspect of the invention, there is provided a binocular having a pair of telescopic optical systems, each of the telescopic optical systems including: a plurality of optical elements, the plurality of optical elements being arranged such that the telescopic optical system has a horizontally extending first optical axis and a vertically extending second optical axis when the binocular is held horizontally by a user; a first compensation optical system that is moved to shift an optical path of light traveling along the second optical axis to compensate trembling of image due to hand vibration applied to the binocular in a horizontal direction when the binocular is held horizontally; and a second compensation optical system that is moved to shift an optical path of light traveling along the first optical axis to compensate trembling of image due to hand vibration applied to the binocular in a vertical direction when the binocular is held horizontally. In this binocular, the second compensation optical system includes a rotatable member which is rotatable about an axis extending parallel to the second optical axis. It should be noted that the rotatable member is equally balanced at the axis. Accordingly, the second compensation optical system is moved without being affected by the gravity.

Optionally, the plurality of optical elements may include first and second prisms constituting an erecting optical system. The first and second prisms respectively have two reflection surfaces, and the first and second prisms may be arranged spaced apart along the second optical axis. With this structure, the first compensation optical systems may be arranged between the first and second prisms.

The first compensation optical system may be constituted to have another rotatable member which is rotatable about another axis extending parallel to the second optical axis. It is preferable that the rotatable member is equally balanced at the axis.

Alternatively, the first compensation optical system may be movable in a direction perpendicular to both of the first and the second optical axis.

According to a further aspect of the invention, there is provided a binocular having a pair of telescopic optical systems, each of the telescopic optical systems including: a plurality of optical elements, the plurality of optical elements being arranged such that the telescopic optical system has a horizontally extending first optical axis and a vertically extending second optical axis when the binocular is held horizontally by a user; a first compensation optical system that is moved to shift an optical path of light traveling along the first optical axis to compensate trembling of image due to hand vibration applied to the binocular in a horizontal direction when the binocular is held horizontally, the first compensation optical system being movable in a direction perpendicular to both of the first and the second optical axis; and a second compensation optical system that is moved to shift an optical path of light traveling along the second optical axis to compensate trembling of image due to hand vibration applied to the binocular in a vertical direction when the binocular is held horizontally.

Optionally, the plurality of optical elements may include first and second prisms constituting an erecting optical system. The first and second prisms respectively have two reflection surfaces, and the first and second prisms are arranged spaced apart along the first optical axis. It is preferable that the second compensation optical systems are arranged between the first and second prisms.

It is preferable that the first and second compensation optical systems have the same structure.

DESCRIPTION OF THE ACCOMPANYING DRAWINGS

DESCRIPTION OF THE EMBODIMENTS

Hereinafter, embodiments of the present invention will be described with reference to the accompanying drawings. In this specification, an observation optical system includes an optical system provided with an objective lens, an erecting optical system, and an eyepiece optical system or the like used to observe an image. Thus, the observation optical system includes a telescope having the erecting optical system, a binocular and the like. It should be noted that the observation optical system also includes a system which is similar to the above but the eyepiece optical system is replaced with an image capturing device having, for example, a CCD (Charge Coupled Device) and an imaging lens.

First Embodiment

Figure 1:
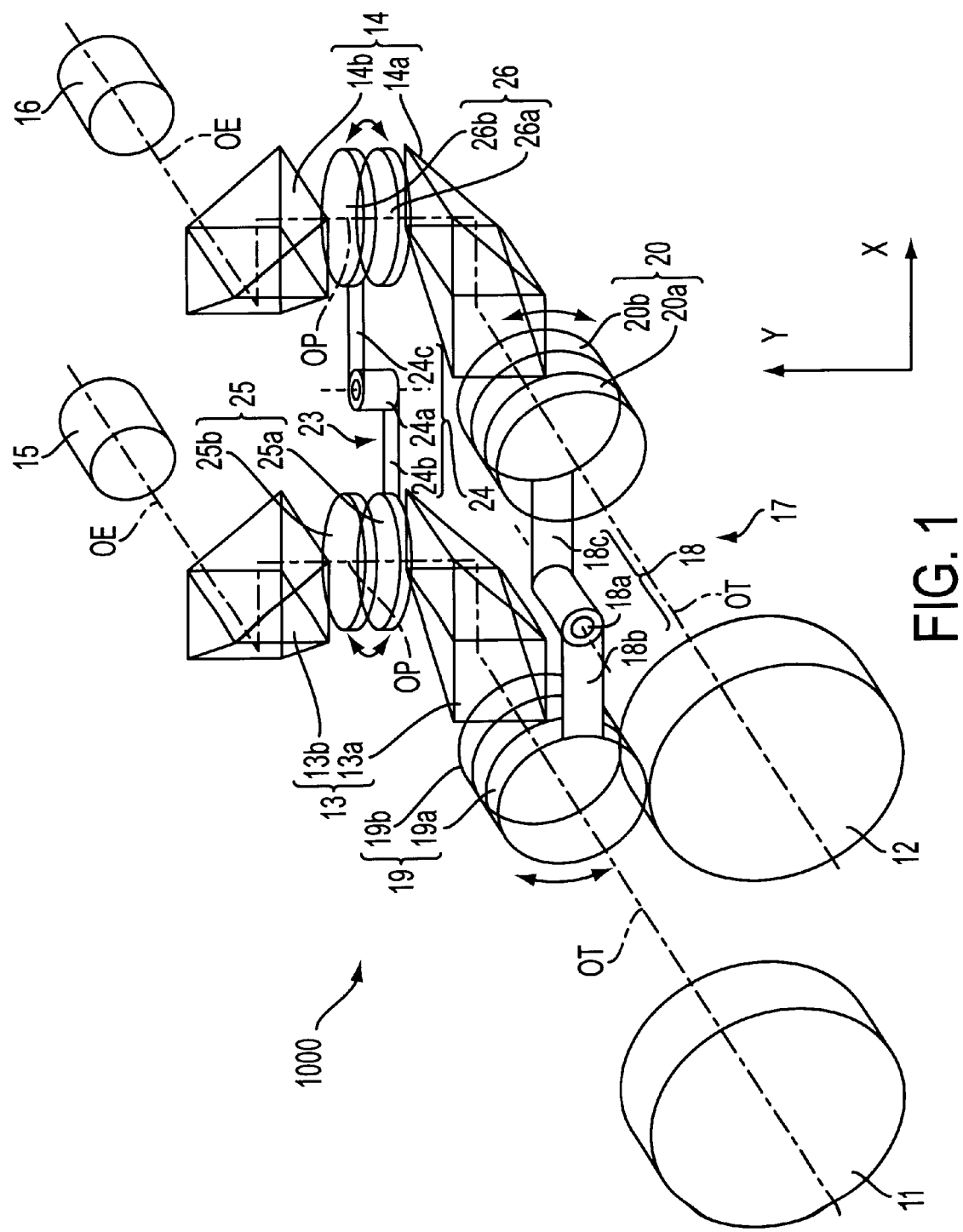
FIG. 1 is a perspective view of an optical system showing arrangement of optical elements of a binocular according to a first embodiment of the invention.

FIG. 1 shows an optical system of a binocular 1000 according to a first embodiment of the invention. The binocular 1000 is provided with a pair of telescopic optical systems for right and left eyes of a user. It should be noted that, in the accompanying drawings, an X-Y axis system is indicated to clarify the direction referred to. The Y axis corresponds to the up/down direction of the user when the binocular is held horizontally by the user, and the X axis corresponds to the right/left direction of the user of the binocular when the binocular is held horizontally.

Figure 16:
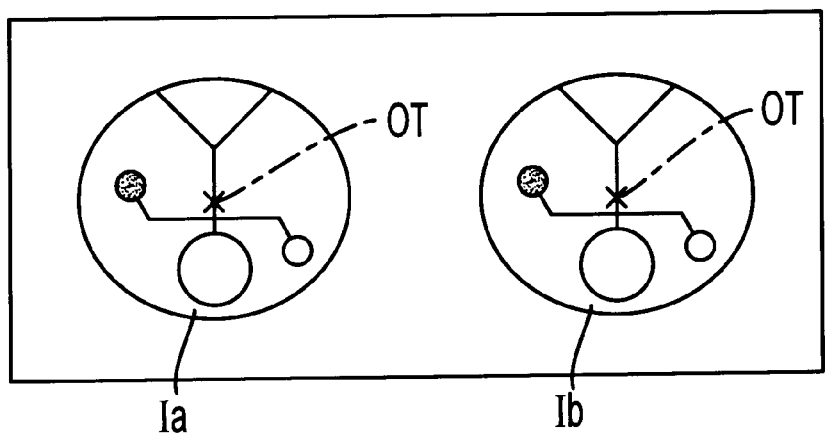
FIG. 16 shows orientation of the images at a position between the objective lens and the erecting optical system.

At a front end of the telescopic optical system for the right eye (on the left-hand side in FIG. 1), a right objective lens 11 is provided, and at a front end of the telescopic optical system for the left eye (on the right-hand side in FIG. 1), a left objective lens 12 is provided. Behind each of the right objective lens 11 and the left objective lens 12, erecting optical systems 13 and 14, each of which has four reflection surfaces, are provided. The objective lenses 11 and 12 respectively form reversed images Ia and Ib, an example of such images are illustrated in FIG. 16.

The erecting optical system 13 included in the right eye telescopic optical system has first and second sub prisms 13*a* and 13*b*, which are arranged in a direction perpendicular to a plane including both of the optical axes OT of the right and left eye telescopic optical systems (i.e., arranged in the Y direction). Specifically, the sub prisms 13*a* and 13*b* are formed by dividing a type II Porro prism into two separate elements. Each of the sub prisms 13*a* and 13*b* has two reflection surfaces.

The first sub prism 13*a* is arranged so as to form a rotated image Ic (see FIG. 17) which is rotated, with respect to the reversed image Ia, by 90 degrees in a clockwise direction viewed from the eyepiece lens side. The light reflected inside the first sub prism 13*a* is then incident on the second sub prism 13*b* in which the light is reflected by the two reflection surfaces so that the erected image becomes observable through the right eyepiece lens 15.

Similar to the erecting optical system 13, the left eye erecting optical system 14 includes a first and second sub prisms 14*a* and 14*b* which are formed by dividing the type II Porro prism. It should be noted that orientation of the sub prisms 13*a* and 14*a* is similar, and orientation of the sub prisms 13*b* and 14*b* is similar. In other words, if the sub prisms 13*a* and 13*b* are shifted to the sub prisms 14*a* and 14*b*, they overlap.

With this structure, the second sub prism 14*a* rotates the reversed image Ib to form a rotated image Id (see FIG. 17), which is rotated, with respect to the reversed image Ia, by 90 degrees in a clockwise direction. The light reflected inside the first sub prism 14*a* is then incident on the second sub prism 14*b* in which the light is reflected by the two reflection surfaces so that the erected image becomes observable through the left eyepiece lens 16.

It should be noted that, although the objective lenses and eyepiece lenses are described as a single lens in the embodiments, each of the lenses may include a plurality of groups and/or a plurality of lenses.

The optical axis of the right (or left) eye telescopic optical system includes the optical axis OT which extends from the objective lens 11 (or 12) to the erecting optical system 13 (or 14), an optical axis OP defined between the first and second sub prisms 13*a* and 13*b* (or 14*a* and 14*b*), and an optical axis OE extending from the erecting optical system 13 (or 14) to the eyepiece lens 15 (or 16). The axes OT and OE are parallel, and the axis OP is perpendicular to the axes OT and OE.

Figure 2A:
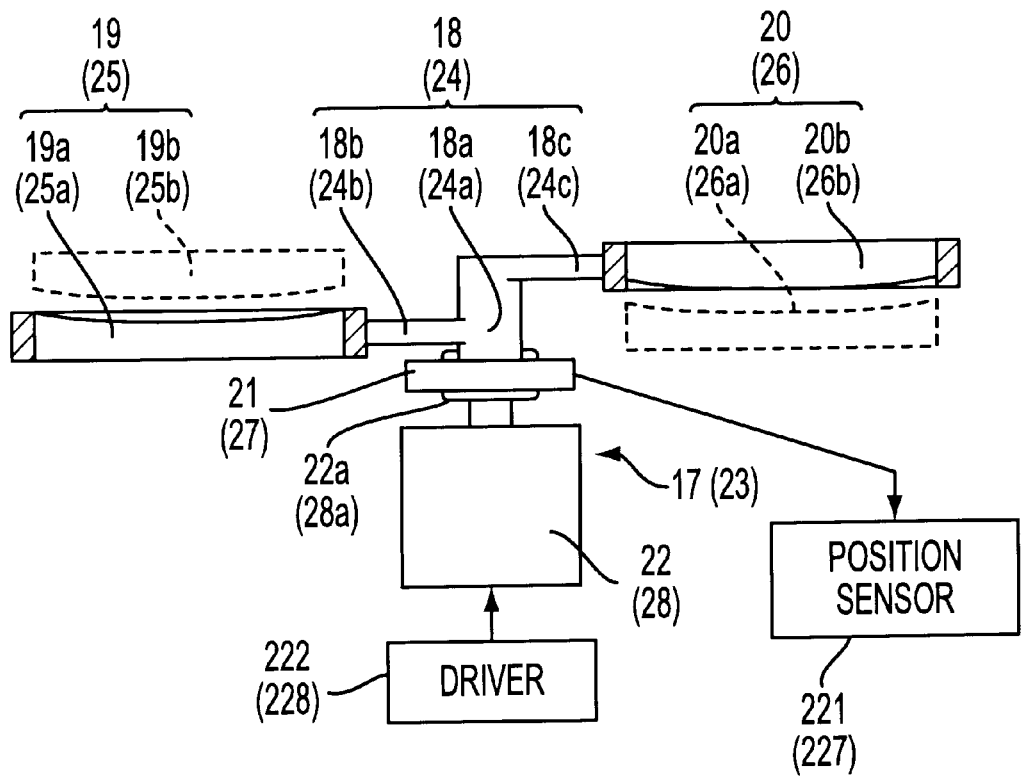
FIG. 2A shows a schematic structure of a hand-vibration compensation mechanism viewed in a direction perpendicular to the optical axis of the binocular shown in FIG. 1.
Figure 2B:
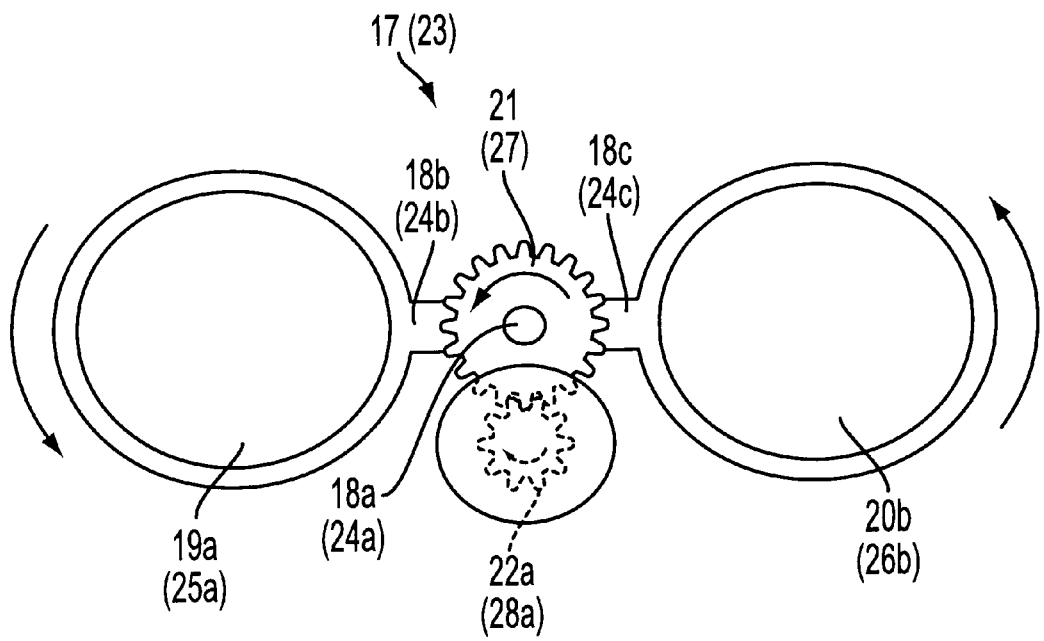
FIG. 2B shows a schematic structure of the hand-vibration compensation mechanism viewed in a direction parallel to the optical axis shown in FIG. 1.

Tn the binocular 1000 according to the first embodiment, between the objective lens (11 or 12) and the first sub prism (13*a* or 14*a*), an up/down hand vibration compensation mechanism 17 (hereinafter referred to as the up/down compensation mechanism) is provided. The up/down compensation mechanism 17 includes a rotatable arm 18. The rotatable arm 18 holds the right and left compensation lenses. The rotation axis 18*a* of the rotatable arm 18 is located at the center of the both of the optical axes OT of the right and left telescopic optical systems, and extends in parallel to the optical axes OT. In the direction perpendicular to the rotation axis 18*a* (i.e., in the X-axis direction in FIG. 1), a right compensation lens frame 18*b* and a left compensation lens frame 18*c* extend in opposite directions. The right and left compensation lenses 19 and 20 are arranged such that the optical axes OT intersect the right and left compensation lenses 19 and 20. As shown in FIGS. 2A and 2B, the right compensation lens 19 includes a negative lens 19*a* and a positive lens 19*b*, which are arranged along the optical axis OT of the right eye telescopic optical system, and the left compensation lens 20 includes a negative lens 20*a* and a positive lens 20*b*, which are arranged along the optical axis OT of the right eye telescopic optical system.

The right compensation lens frame 18*b* holds the negative lens 19*a*, and the left compensation lens frame 18*c* holds the positive lens 20*b*. Therefore, the right compensation lens frame 18*b* and the left compensation lens frame 18*c* are apart by a predetermined amount along the optical axes OT.

The negative lenses 19*a* and 20*a* are the same lenses, and the positive lenses 19*b* and 20*b* are the same lenses. Further, the lenses 19*a* and 20*b* are formed such that, when these lenses are decentered (i.e., the optical axis of the lenses 19*a* and 20*b* are moved in a direction perpendicular to the optical axes OT), the optical paths of light passed through the lenses 19*a* and 20*b* shift by the same amount but in the opposite directions. The positive lens 19*b* and the negative lens 20*a*, which are not held by the rotatable arm 18, are arranged such that the optical axes thereof coincide with the optical axes OT, respectively.

To the front end (i.e., the object side end) of the shaft 18*a*, a driving gear 21 is secured, with which a pinion gear 22*a* of a motor 22 is engaged. The motor 22 is driven to rotate in either direction such that the pinion gear 22*a* is rotated in a forward or reverse direction. As shown in FIG. 2B, when the pinion gear 22*a* is rotated in the clockwise direction in the drawing, the arm 18 is driven to rotate in the counterclockwise direction about the shaft 18*a* via the driving gear 21. When the pinion gear 22*a* is rotated in the counterclockwise direction in the drawing, the arm 18 is rotated in the clockwise direction.

As described above, by rotating the arm 18 with the motor 22, the negative lens 19*a* and the positive lens 20*b* which are arranged on the opposite positions with respect to the shaft 18*a* can be displaced in opposite directions within a plane perpendicular to the optical axes OT and OT of the telescopic optical systems. Since each of the negative lens 19*a* and the positive lens 20*b* moves along a circle whose center is the central axis of the shaft 18*a*, when displaced, the negative lens 19*a* and the positive lens 20*b* are displaced in the right/left direction (i.e., in the X-axis direction in FIG. 1) as well as in the up/down direction (i.e., in the Y-axis direction in FIG. 1). However, the amount of displacement in the right/left direction is small and can be ignored. Thus, the negative lens 19*a* and the positive lens 20*b* are moved mainly in the up/down direction when the rotatable arm 18 is rotated.

It should be noted that when the rotatable arm 18 is rotated, the negative lens 19*a* and the positive lens 20*b* are moved in the opposite directions with respect to the reversed images Ia and Ib. However, as described above, the positions of the reversed images Ia and Ib are shifted in the same direction.

As shown in FIG. 2A, a position sensor 221 is provided to detect a rotational position of the arm 18 with respect to its initial position. It should be noted that, the optical axes of the lenses 19a and 20b coincide with the optical axes OT when positioned at the initial position.

Figure 3:
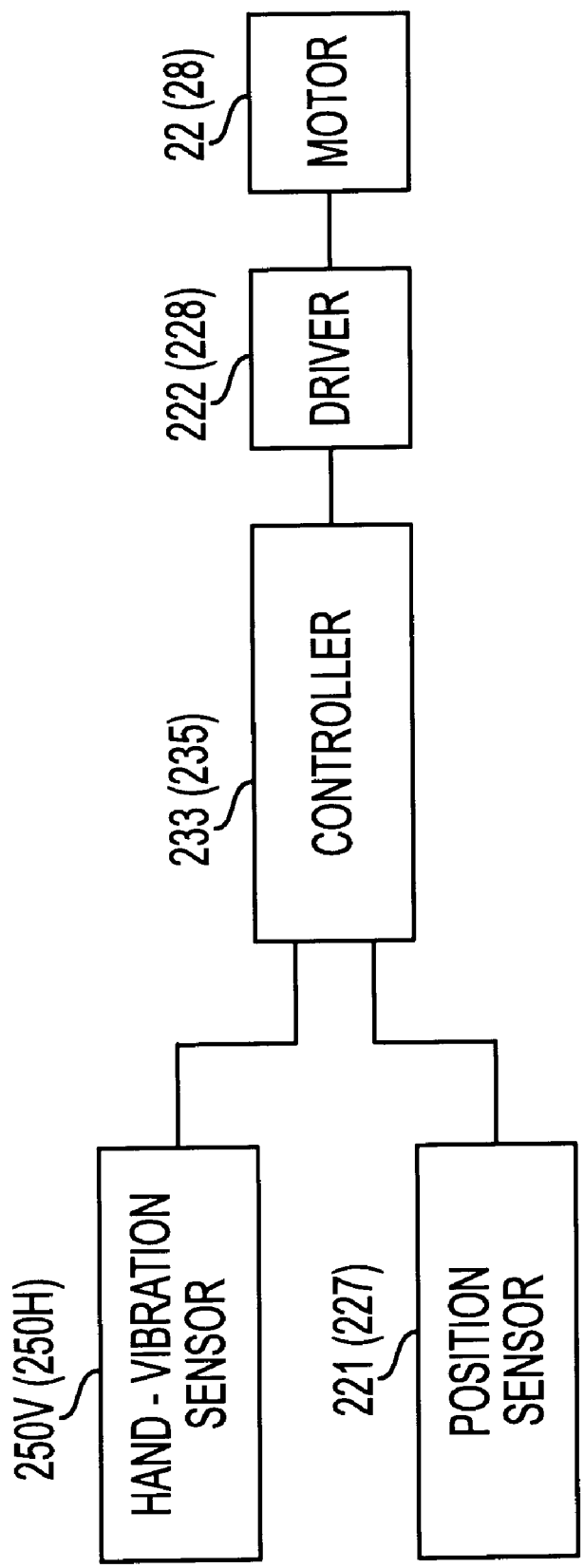
FIG. 3 shows a block diagram illustrating a control system for driving the hand-vibration compensation mechanisms.

Further, as shown in FIG. 3, the up/down compensation mechanism is provided with a hand-vibration sensor 250V for detecting the hand-vibration of a component in the up/down direction (i.e., Y-axis direction in FIG. 1). Output signals of the hand-vibration sensor 250V and the position sensor 221 are input to a controller 233. The controller 233 calculates amount of movement in the up/down direction due to the hand-vibration, and controls a driver 222 to drive the motor 22 by an amount corresponding to the amount of movement due to the hand-vibration. Specifically, the controller 233 determines a target position to which the arm 18 is to be positioned for canceling change of the position of the image due to the hand-vibration based on the amount of movement detected by the hand-vibration sensor. Then, the controller 233 controls the driver to move the arm to the calculated target position with monitoring the position detected by the position sensor. As the above control is continuously executed, the controller 233 continuously updates the target position, and accordingly, trembling of the images due to the hand-vibration in the up/down direction can be compensated.

The right/left compensation mechanism 23 is arranged between the first sub prisms 13a and 14a, and the second sub prisms 13b and 14b. As shown in FIG. 1, the right/left compensation mechanism 23 is inserted in the optical axes OP defined between the first and second sub prisms. As shown in FIGS. 2A and 2B, the right/left compensation mechanism 23 has the same structure as the up/down compensation mechanism 17. The right/left compensation mechanism 23 includes a rotatable arm 24 which is located between the right and left optical axes OP and extends in a direction parallel to the optical axes OP. The rotatable arm 24 is made rotatable about a shaft 24a. The rotatable arm 24 has a right compensation lens holding frame 24b and a left compensation lens holding frame 24c.

The right/left compensation mechanism 23 includes right and left compensation optical systems 25 and 26, each of which includes a negative lens 25a (26a) and a positive lens 25b (26b) which are arranged along the optical axis OP. The negative lens 25a and the positive lens 26b are held by the right compensation lens holding frame 24b and the left compensation lens holding frame 24c, respectively. The positive lens 25b and the negative lens 26a, which are not held by the lens holding frames 24b and 24c are fixed inside the binocular such that the optical axes thereof coincide with the optical axes OP and OP, respectively.

To the front end of the shaft 24a, a driving gear 27 is secured, with which a pinion gear 28a of a motor 28 is engaged. The motor 28 is driven to rotate in either direction such that the pinion gear 28a is rotated in a forward or reverse direction. As the pinion gear 28a is rotated, the arm 24 is rotated.

The optical axis OP defined between the first sub prism 13a (14a) and the second sub prism 13b (14b) is an axis which extends in a direction perpendicular to a plane including the optical axes OT of the objective lens systems (i.e., in the Y-axis direction). Accordingly, the rotation arm 24 is arranged such that the shaft 24a extends perpendicular to the shaft 18a of the rotatable arm 18. With this construction, in the compensation mechanism 23, the negative lens 25a and the positive lens 26b are rotatable within a plane perpendicular to the optical axes OT and OT. In other words, the same mechanism is used for the right/left compensation mechanism 23 and for the up/down compensation mechanism 17 only by changing the direction of the shaft.

It should be noted that at the position where the right/left compensation mechanism 23 is provided, the images Ic and Id have been rotated by 90 degrees, with respect to the images Ia and Ib, by the first sub prisms 13 and 14, respectively. Therefore, by rotating the rotatable arm 24, trembling of the observed image due to the hand vibration in the right/left direction of the images Ic and Id can be compensated. The negative lens 25a and the positive lens 26b move in the opposite directions. However, since the two lenses 25a and 26b are negative and positive lenses, the compensation is made in the same direction. Thus, by rotating the rotatable arm 24, the trempling of the images due to the hand vibration applied to the binocular in the right/left direction is compensated.

As shown in FIG. 2A, a position sensor 227 is provided to detect a rotational position of the arm 24 with respect to the initial position.

Further, as shown in FIG. 3, the right/left compensation mechanism is provided with a hand-vibration sensor 250H for detecting the hand-vibration of a component in the right/left direction (i.e., X-axis direction in FIG. 1). Output signals of the hand-vibration sensor 250H and the position sensor 227 are input to a controller 235. The controller 235 calculates amount of movement in the right/left direction due to the hand-vibration, and controls a driver 228 to drive the motor 28 by an amount corresponding to the amount of movement due to the hand-vibration. Specifically, the controller 235 determines a target position to which the arm 24 is to be positioned for canceling change of the position of the image due to the hand-vibration based on the amount of movement detected by the hand-vibration sensor 250H. Then, the controller 233 controls the driver 228 to move the arm 24 to the calculated target position with monitoring the position detected by the position sensor 227. As the above control is continuously executed, the controller 235 continuously updates the target position, and accordingly, trembling of the image due to the hand-vibration in the right/left direction can be compensated.

With the structure described, the advantage described below is achieved.

Firstly, the right/left compensation mechanism 23 is arranged such that the lenses 25a and 26b are moved within a plane perpendicular to a direction of the gravity when the binocular is held horizontally by the user. Accordingly, in this condition, driving of the arm 24 (i.e., movement of the lenses 25a and 26b) is not affected by the gravity. On the other hand, since the up/down compensation mechanism 17 is arranged such that the lenses 19a and 20b rotate about the shaft 18a. If the weight of the lenses 19a and 20b are substantially the same, i.e., the rotation arm 18 is equally balanced at the shaft 18a, movement of the lenses 19a and 20b, i.e., rotation of the arm 18 will not be affected by the gravity even when the binocular is held horizontally by the user. Further, since the rotation arm 24 is also equally balanced at the shaft 24a, movement of the lenses 25a and 26b will not be affected by the gravity even if the binocular is not held horizontally.

Thus, the up/down compensation mechanism 17 and the right/left compensation mechanism 23 do not require a driving device having a relatively great torque for resisting the gravity force. Since the torque of the driving device can be made small, power consumption of such driving device is relatively small, and therefore a battery can be made small. Furthermore, in the first embodiment, the up/down compensation mechanism 17 and the right/left compensation mechanism 23 have the same structure, and therefore the number of kinds of parts is made small. Accordingly, the manufacturing cost can be reduced in comparison to a case where the two compensation mechanisms have different structures.

Optionally, in the first embodiment, since the diameter of the cross section of a beam traveling from the first prism 13a (14a) to the second prism 13b (14b) is smaller than that passing through the lens 19 (20) of the up/down compensation mechanism 17, the diameter of the lenses 25 and 26 of the right/left compensation mechanism 23 may be made smaller which make it possible to reduce the size and weight of the compensation mechanism.

The present invention is directed to part of a binocular that includes hand-vibration sensors, sensors for detecting the position of the compensation lenses, and such elements have thus been shown generally in FIG. 3. However, the details of the hand-vibration sensors and/or position detection sensors do not form part of the invention. These are provided to assist in understanding of the invention, and any types of suitable hand-vibration sensors and/or position detecting sensors could be employed to control the up/down compensation mechanism and/or the right/left compensation mechanism.

Second Embodiment

Figure 4:
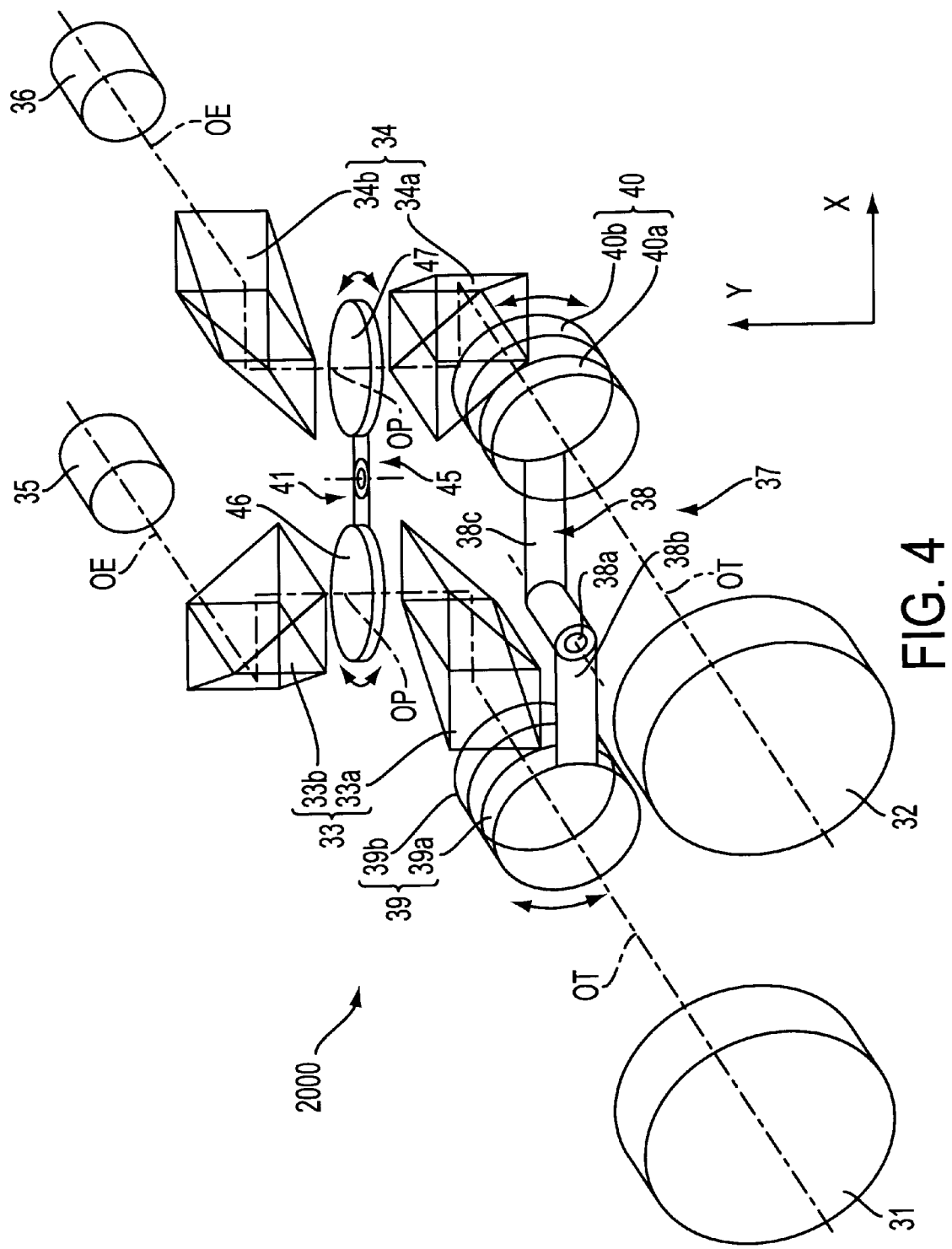
FIG. 4 is a perspective view showing arrangement of optical elements of a binocular according to a second embodiment of the invention.
Figure 5:
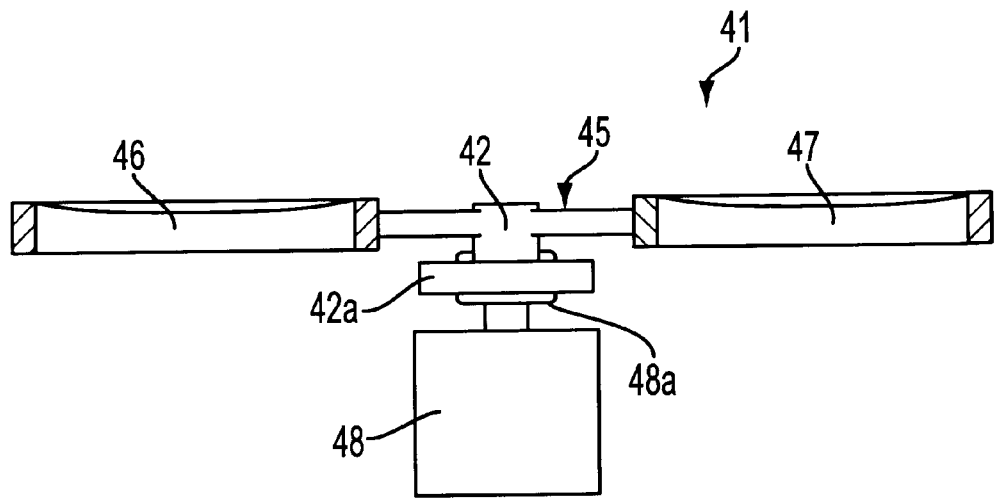
FIG. 5 shows a schematic structure of a right/left compensation mechanism employed in the binocular shown in FIG. 4, in a direction perpendicular to the optical axis of the binocular.

FIG. 4 is a perspective view of an arrangement of optical elements of a binocular 2000 according to a second embodiment of the invention. FIG. 5 is a side view of a right/left hand vibration compensation mechanism 41 employed in the binocular 2000 according to the second embodiment.

As shown in FIG. 4, the binocular 2000 includes right and left objective lenses 31 and 32, right and left erecting optical systems 33 and 34, and right and left eyepiece lenses 35 and 36.

The erecting optical system 33, which is a type II Porro prism, for right eye is divided into first and second sub prisms 33a and 33b; and the erecting optical system 34, which is also the type II Porro prism, for left eye is also divided into first and second sub prisms 34a and 34b.

Similar to the first embodiment, an optical axis of the right (or left) eye telescopic optical system includes an optical axis OT which extends from the objective lens 31 (or 32) to the erecting optical system 33 (or 34), and optical axis OP defined between the first and second sub prisms 33a and 33b (or 34a and 34b), and an optical axis OE which extends from the erecting optical system 33 (or 34) to the eyepiece lens 35 (or 36). The axes OT and OE are parallel to each other, and the axis OP is perpendicular to the axes OT and OE.

On the optical axis OT, i.e., between the objective lens 31 (or 32) and the erecting optical system 33 (or 34), an image Ia (or Ib) of the object is reversed as shown in FIG. 16.

Figure 18:
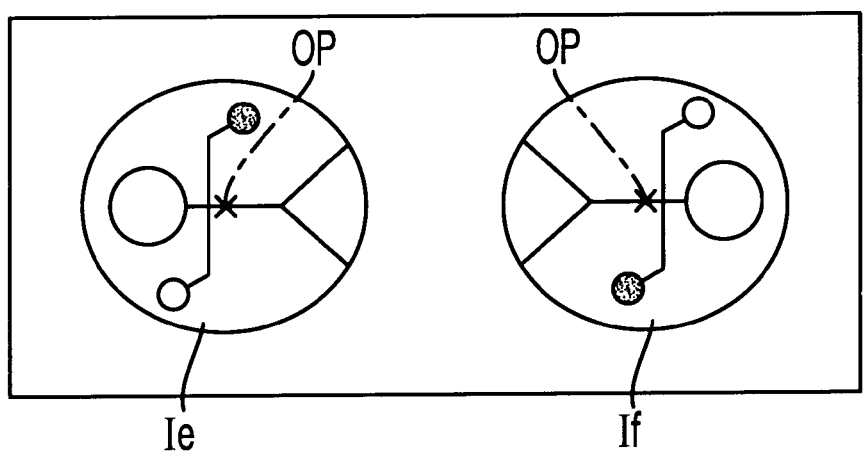
FIG. 18 shows another example of orientation of the images at a position between the first and second sub prisms.

The erecting optical system 33 is similar to the erecting optical system 13 employed in the first embodiment. That is, on the optical axis OP, i.e., between the first and second sub prisms 33a and 33b, an image Ie which is rotated by 90 degrees with respect to the image Ia is formed (rotated) by the first sub prism 33a as shown in FIG. 18. By the second sub prism 33b, the image is erected, which is observed through the eyepiece lens 35.

The erecting optical systems 33 and 34 are arranged symmetrically with respect to a plane at the center of the optical axes OT and OP, and parallel to the optical axes OT and OP. Therefore, on the optical axis OP, i.e., between the first and second sub prisms 34a and 34b, an image, which is rotated by −90 degrees with respect to the image Ib, is formed by the first sub prism 34a as shown in FIG. 18. By the second sub prism 34b, the image is erected, which is observed through the eyepiece lens 36.

Between the objective lenses 31 and 32, and the first sub prisms 33a and 34a, an up/down hand vibration compensation mechanism 37 is provided. The up/down compensation mechanism 37 is similar to the up/down compensation mechanism 17 employed in the first embodiment.

The up/down compensation mechanism 37 includes a rotatable arm 38 which holds the right and left compensation lenses. The shaft 38a of the rotatable arm 38 is located at the center of the both of the optical axes OT of the right and left telescopic optical systems, and extends in parallel to the optical axes OT. In the direction perpendicular to the shaft 38a (i.e., in the X-axis direction in FIG. 4), a right compensation lens frame 38b and a left compensation lens frame 38c extend in opposite directions. The right and left compensation lenses 39 and 40 are arranged such that the optical axes OT intersect the right and left compensation lenses 39 and 40. Similar to the first embodiment, a right compensation lens frame holds a negative lens 39a, and a left compensation lens frame holds a positive lens 40b.

The negative lenses 39a and 40a are the same lenses, and the positive lenses 39b and 40b are the same lenses. Further, the lenses 39a and 40b are formed such that, when these lenses are decentered (i.e., the optical axis of the lenses 39a and 40b are moved in a direction perpendicular to the optical axes OT), the optical paths of light passed through the lenses 39a and 40b are shifted by the same amount but in the opposite directions. The positive lens 39b and the negative lens 40a, which are not held by the rotatable arm 38, are arranged such that the optical axes thereof coincide with the optical axes OT, respectively.

Similar to the compensation mechanism 17 of the first embodiment, by rotating the arm 38, the negative lens 39a and the positive lens 40b are displaced in opposite directions within a plane perpendicular to the optical axes OT and OT of the telescopic optical systems.

Figure 6:
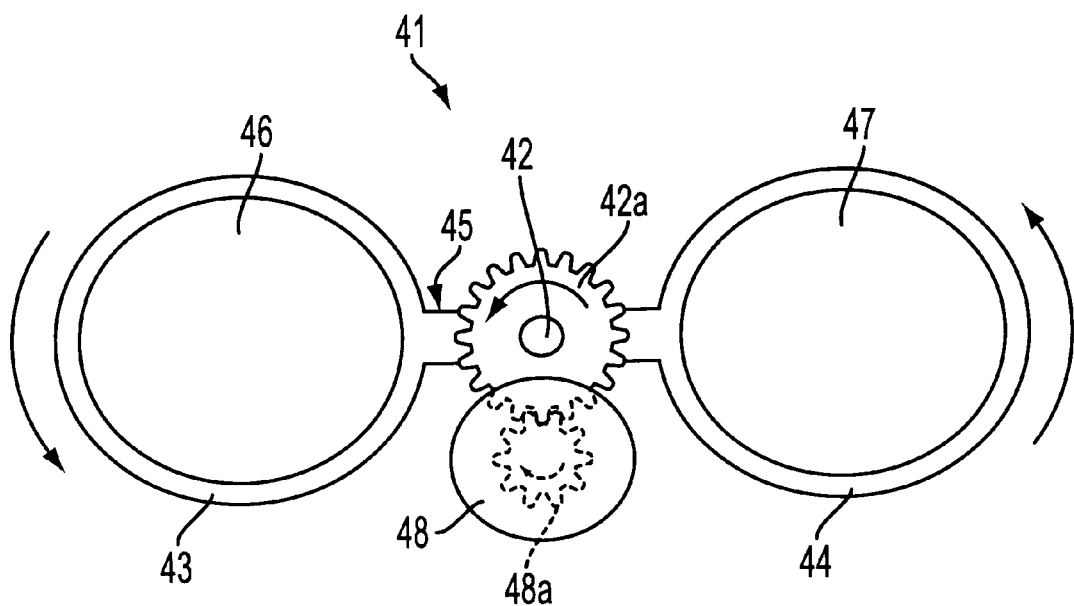
FIG. 6 shows a schematic structure of the right/left compensation mechanism employed in the binocular shown in FIG. 4, in a direction parallel to the optical axis of the binocular.

Between the first sub prisms 33a and 40a, and the second sub prisms 33b and 40b, a right/left compensation mechanism 41 is provided. The right/left compensation mechanism 41 includes a rotatable arm 45. The rotatable arm 45 holds right and left compensation lenses 46 and 47. The arm 45 is rotatable about a shaft 42 (see FIGS. 5 and 6). The shaft 42 of the rotatable arm 45 is located at the center of the both of the optical axes OP of the right and left telescopic optical systems, and extends in parallel to the optical axes OP. In the direction perpendicular to a plane that includes the optical axes OT, i.e., in the Y-axis direction in FIG. 4, a right compensation lens frame 43 and a left compensation lens frame 44 extend in opposite directions along X axis. The right and left compensation lenses 46 and 47 are held by the lens frames 43 and 44, respectively. As shown in FIGS. 5 and 6, the compensation lenses 46 and 47 are negative lenses having the same power. Thus, when the lenses 46 and 47 are moved in opposite directions, the optical paths of light passed through the lenses 46 and 47 are shifted in the opposite directions, but by the same amount.

To the shaft 42, a driving gear 42a is secured, with which a pinion gear 48a of a motor 48 is engaged. The motor 48 is driven to rotate in either direction such that the pinion gear 48a is rotated in a forward or reverse direction. As shown in FIG. 6, when the pinion gear 48a is rotated in the clockwise direction in the drawing, the arm 45 is driven to rotate in the counterclockwise direction about the rotation shaft 42 via the driving gear 42a. When the pinion gear 48a is rotated in the counterclockwise direction in the drawing, the arm 45 is rotated in the clockwise direction.

As described above, by rotating the arm 45 with the motor 48, the negative lenses 46 and 47 are moved in opposite directions within a plane which is perpendicular to the optical axes OP, and parallel to a plane including the optical axes OT of the telescopic optical systems. Since the negative lenses 46 and 47 move along a circle whose center is the rotation axis of the shaft 42, when displaced, the negative lenses 46 and 47 are displaced in the X-axis direction in FIG. 4 as well as in the direction perpendicular to the X and Y axes. However, the amount of displacement in the X-axis direction is small and can be ignored. Thus, the negative lenses 46 and 47 are moved mainly in the Y-axis direction when the rotatable arm 45 is rotated.

It should be noted that when the rotatable arm 45 is rotated, the negative lenses 46 and 47 are moved in the opposite directions with respect to the reversed images Ia and Ib. Since the images Ie and If at the position between the first sub prisms 33a and 34a, and the second sub prisms 33b and 34b have been rotated with respect to the reversed images Ia and Ib by 90 degrees in the opposite directions, by rotating the arm 45, i.e., by moving the negative lenses 46 and 47 in the opposite directions, the imaged Ie and If are shifted in the same direction when viewed through the eyepiece lenses 35 and 36. Thus, by rotating the arm 45, trembling of the images due to the hand vibration in the right/left direction can be compensated.

It should be noted that the lenses 46 and 47 could be positive lenses having the same power.

In the second embodiment, a control system similar to that shown in FIG. 3 or any other suitable control systems including the hand-vibration sensor and the position sensor for detecting the position of the frame 38 can be used. Since the control system has been described above with reference to FIG. 3, description and drawing of the control system applicable to the second embodiment will be omitted.

Thus, each of the up/down compensation mechanism 37 and the right/left compensation mechanism 41 do not require a motor having a relatively great torque for resisting the gravity force. Since the torque of the motor can be made small, power consumption of such a motor is relatively small, and therefore a battery for supplying power to the motor can also be made small. Further, since the erecting optical systems 33 and 34 are arranged symmetrically so that the images Ie and If are rotated in opposite directions, it becomes possible to use the same kind of lens as compensation lenses 46 and 47. Since the same lens can be used as the compensation lenses 46 and 47, the structure of the right/left compensation mechanism can be made simple.

Optionally, since the diameter of cross section of a beam traveling from the first prism 33a (34a) to the second prism 33b (34b) is smaller than that passing through the lenses 39 (40) of the up/down compensation mechanism, the diameter of the lens 46 (47) of the right/left compensation mechanism 41 may be made smaller which make it possible to reduce the size and weight of the right/left compensation mechanism 41.

Third Embodiment

Figure 7:
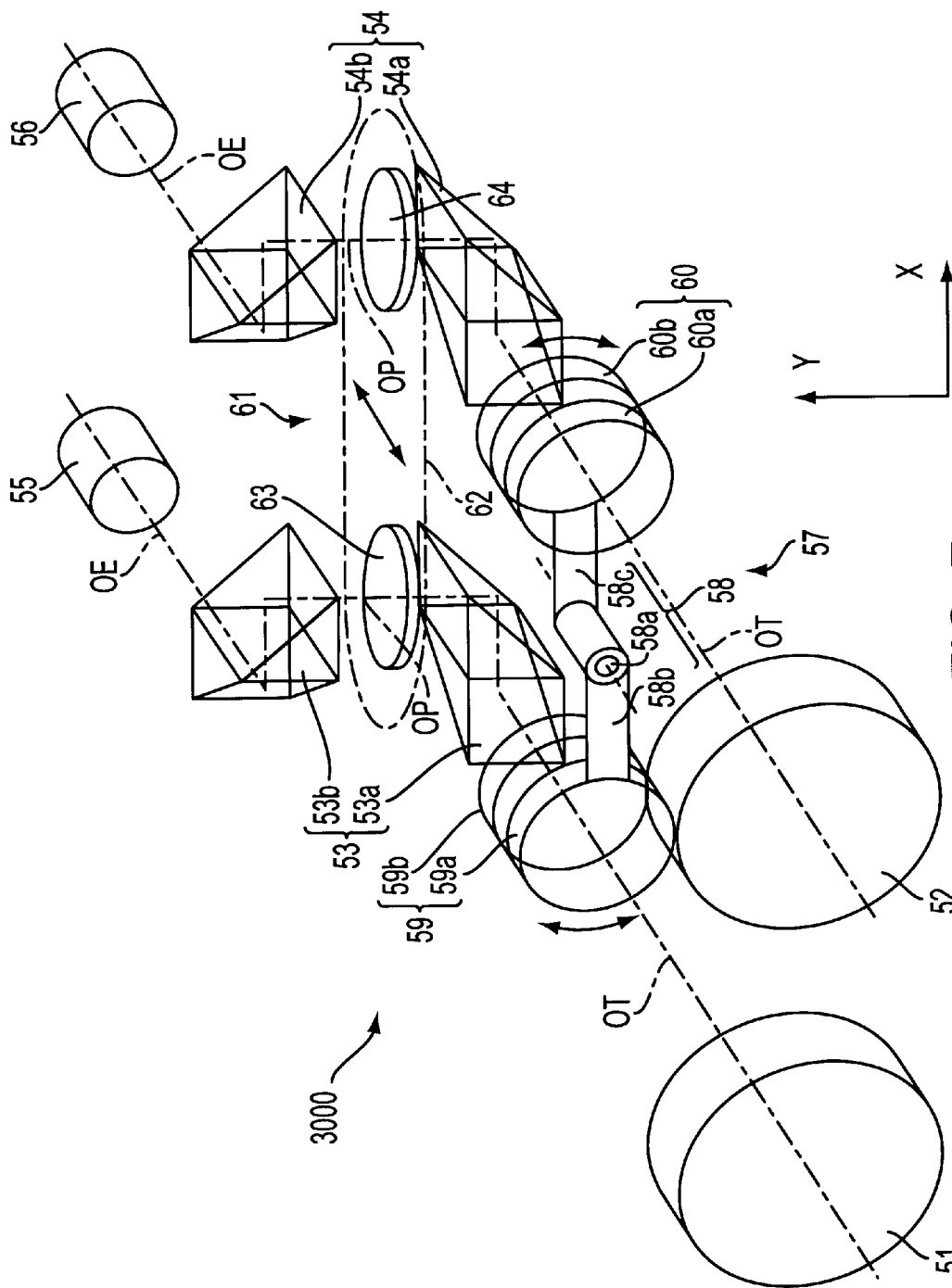
FIG. 7 is a perspective view showing arrangement of optical elements of a binocular according to a third embodiment of the invention.
Figure 8:
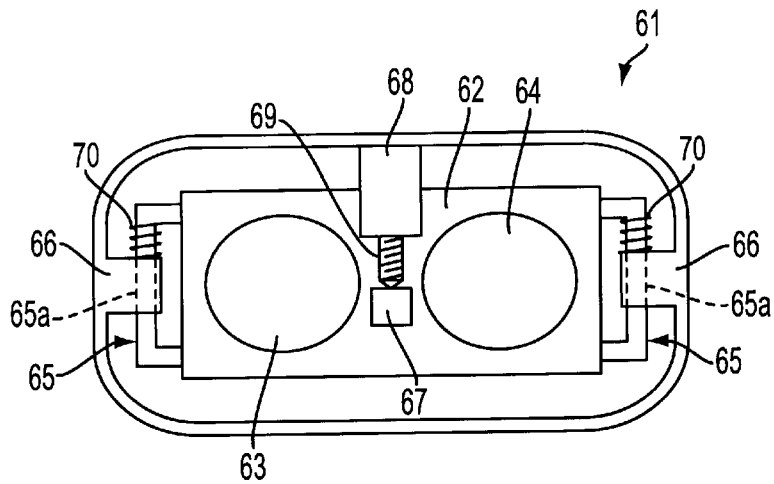
FIG. 8 shows a schematic structure of a right/left compensation mechanism employed in the binocular shown in FIG. 7.

FIG. 7 is a perspective view of an arrangement of optical elements of a binocular 3000 according to a third embodiment of the invention. FIG. 8 schematically shows a right/left hand vibration compensation mechanism employed in the binocular according to the third embodiment.

As shown in FIG. 7, the optical system of the binocular 3000 is similar to that of the first embodiment except the right/left compensation mechanism. The optical system according to the third embodiment includes right and left objective lenses 51 and 52, right and left erecting optical systems 53 and 54, and right and left eyepiece optical systems 55 and 56.

The erecting optical system 53 for right eye, which is a type II Porro prism, is divided into first and second sub prisms 53a and 53b; and the erecting optical system 54, which is also the type II Porro prism, for left eye is also divided into first and second sub prisms 54a and 54b.

The optical axis of the right (or left) eye telescopic optical system includes an optical axis OT which extends from the objective lens 51 (or 52) to the erecting optical system 53 (or 54), and optical axis OP defined between the first and second sub prisms 53a and 53b (or 35a and 54b), and an optical axis OE which extends from the erecting optical system 53 (or 54) to the eyepiece lens 55 (or 56). The axes OT and OE are parallel to each other, and the axis OP is perpendicular to the axes OT and OE.

Figure 17:
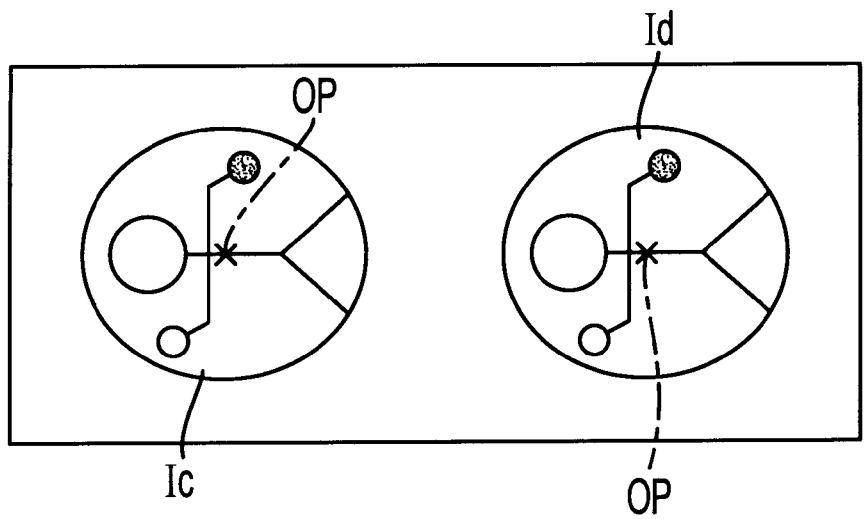
FIG. 17 shows orientation of the images at a position between the first and second sub prisms.

On the optical axis OT, i.e., between the objective lens 51 (or 52) and the erecting optical system 53 (or 54), an image Ia (or Ib) of the object is reversed as shown in FIG. 16. On the optical axis OP, i.e., between the first and second sub prisms 53a and 53b (or 54a and 54b), an image Ic (or Id) which is rotated by 90 degrees with respect to the image Ia (or Ib) is formed (rotated) by the first sub prism 53a (or 54a) as shown in FIG. 17. By the second sub prism 53b (or 54b), the image is erected, which is observed through the eyepiece lens 55 (or 56).

In the third embodiment, an up/down compensation mechanism 57 is employed, which is similar to the up/down compensation mechanism 17 employed in the first embodiment.

The up/down compensation mechanism 57 is provided between the objective lenses 51 and 52, and the first sub prisms 53a and 54a. The up/down compensation mechanism 57 is similar to the up/down hand vibration compensation mechanism 17 employed in the first embodiment.

The up/down compensation mechanism 57 includes a rotatable arm 58 which holds the right and left compensation lenses 59 and 60. The shaft 58a of the rotatable arm 58 is located at the center of the both of the optical axes OT of the right and left telescopic optical systems, and extends in parallel to the optical axes OT. In the direction perpendicular to the shaft 58a and parallel to a plane including the optical axes OT (i.e., in the X-axis direction in FIG. 7), a right compensation lens frame 58b and a left compensation lens frame 58c extend in opposite directions (in the X-axis direction). The right and left compensation lenses 59a and 60b are held by the lens frames 58b and 58c, while lenses 59b and 60a are fixed to the binocular. The lenses 59a, 59b, 60a and 60b are arranged such that the optical axes OT intersect the lenses 59a, 59b, 60a and 60b when the arm 58 is located at its neutral position (as shown in FIG. 7).

The lenses 59a and 60a are the same lenses, and the positive lenses 59b and 60b are the same lenses. Further, the lenses 59a and 60b are formed such that, when these lenses are decentered (i.e., the optical axis of the lenses 59a and 60b are moved in a direction perpendicular to the optical axes OT), the optical paths of light passed through the lenses 59a and 60b are shifted by the same amount but in the opposite directions. The positive lens 59b and the negative lens 60a, which are not held by the rotatable arm 58, are arranged such that the optical axes thereof coincide with the optical axes OT, respectively.

With this construction, similar to the compensation mechanism 17 of the first embodiment, by rotating the arm 58, the negative lens 59a and the positive lens 60b are displaced in opposite directions within a plane perpendicular to the optical axes OT and OT of the telescopic optical systems. Thus, trembling of the images Ia and Ib due to the hand vibration in the up/down direction (in the Y-axis direction) can be compensated.

Between the first sub prisms 53a and 54a, and the second sub prisms 53b and 54b, the right/left compensation mechanism 61 is provided. The right/left compensation mechanism 61 has, as shown in FIG. 8, a rectangular lens frame 62 which holds a pair of compensation lenses 63 and 64 at openings formed thereon. The compensation lenses 63 and 64 are provided to intersect the optical axes OP of the right and left telescopic optical systems. The pair of compensation lenses 63 and 64 are the same lens. As shown in FIG. 8, at longitudinal side ends of the lens frame 62, a pair of guide bars 65 and 65 are provided. Linear slide guide bars 65a and 65a are slidably fitted in through-holes formed in a pair of arms 66 and 66 which are formed inside the body of the binocular. With this structure, the lens frame 62 is movable in a direction parallel to the optical axes OT, and perpendicular to the optical axes OP.

On a surface of the lens frame 62, which is a surface perpendicular to the optical axes OP, a projection 67 is formed between the pair of compensation lenses 63 and 64. On the body of the binocular 3000, an actuator 68 is provided, and a plunger 69 of the actuator 68 abuts the side surface of the projection 67. The actuator 68 is constituted such that when an electrical power is applied thereto, the plunger 69 protrudes/retracts in the up and down direction in FIG. 8. Accordingly, when electrical power is-applied to the actuator 68 to make the plunger 69 protrude, the projection 67 is pushed thereby and the lens frame 62 moves in downward direction in FIG. 8.

As shown in FIG. 8, coil springs 70 are provided to the linear slide guide bars 65a and 65a to bias the lens frame 62 in the upward direction in FIG. 8 with respect to the body of the binocular. Thus, when the actuator 68 is driven so that the plunger 69 protrudes, the lens frame 62 moves in downward direction in FIG. 8, while when the actuator 68 is driven so that the plunger 69 retracts, then due to forth of the coil springs 70, the projection 67 is kept contacting the plunger 69, i.e., the-lens frame 62 moves in the upward direction in FIG. 8. Thus, by driving the actuator 68, the lens frame 62 moves in a direction perpendicular to a plane including the optical axes OP of the right and left telescopic optical systems, that is, in the up/down direction in FIG. 8.

At the position where the compensation mechanism 57 is provided, the direction of movement of the lenses 59a and 60b coincides with the up/down direction of the reversed images Ia and Ib. Therefore, by rotating the arm 58 in accordance with the signal indicative of the hand vibration in the up/down direction, trembling of the images due to the hand-vibration in the up/down direction (i.e., Y-axis direction) can be compensated.

At the position where the compensation mechanism 61 is provided, the images Ic and Id have been rotated in the same direction by 90 degrees with respect to the images Ia and Ib. Therefore, the direction of movement of the lenses 63 and 64 coincides with the right/left direction of the images Ic and Id. Therefore, by controlling the actuator 68 in accordance with the signal indicative of the hand vibration in the right/left direction, trembling of the images due to the hand-vibration in the right/left direction can be compensated.

In the third embodiment, a control system similar to that shown in FIG. 3 or any other suitable control systems including the hand-vibration sensor and the position sensor for detecting the position of the compensation lenses can be used. Since the control system has been described with reference to FIG. 3, and it can be easily modified to be applicable to the fifth embodiment, description and drawing of the control system applicable to the third embodiment will be omitted.

Third Embodiment-Alternative Structure

Figure 9:
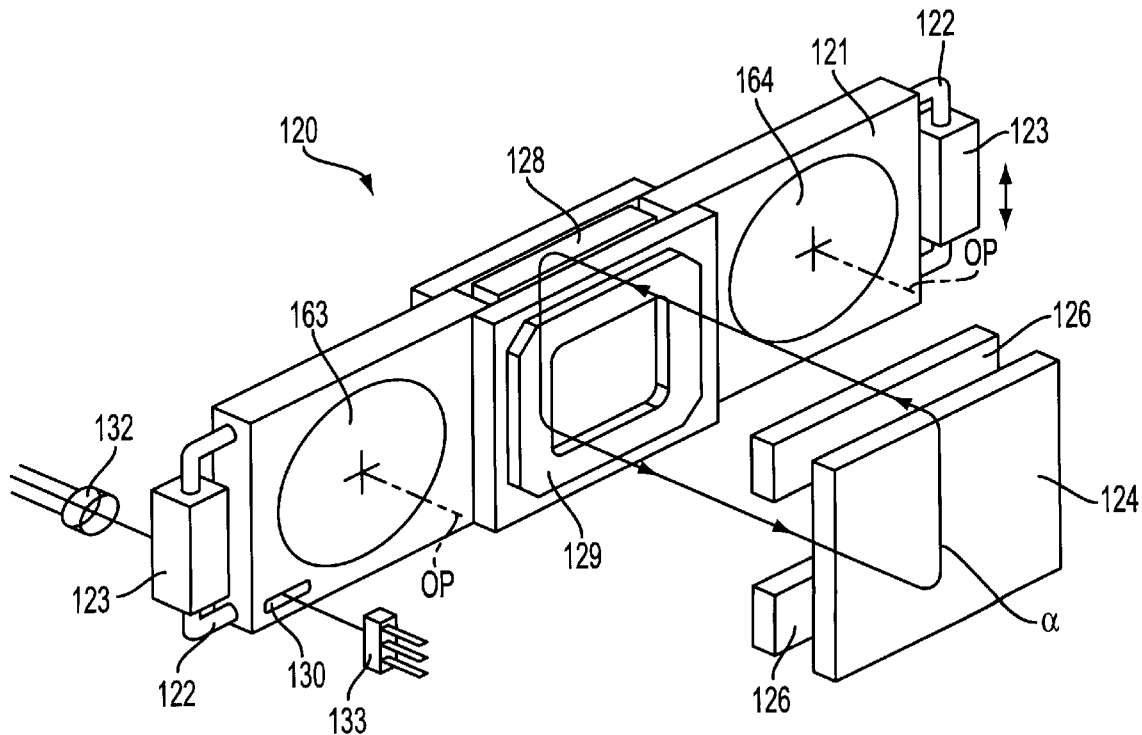
FIG. 9 shows a schematic structure of a right/left compensation mechanism, which is an alternative structure of the hand-vibration compensation mechanism shown in FIG. 8.

FIG. 9 shows a compensation mechanism 120, which is an alternative to the mechanism shown in FIG. 8. That is, the compensation mechanism 120 can be used instead of the compensation mechanisms 61 in FIG. 7.

The mechanism 120 has a lens frame 121, which is provided with a pair of guide bars 122 at its longitudinal end portions. The guide bars 122 are slidably fitted in through holes formed in supporting arms 123, respectively. The lens frame 121 holds compensation lenses 163 and 164, which are movable in a direction perpendicular to a plane including the optical axes OT of both of the telescopic optical systems of the binocular.

On one side of the lens frame 121, a yoke plate 124 is provided, and between the yoke plate 124 and the lens frame 121, a pair of permanent magnets 126 are provided. Each of the permanent magnets 126 elongated and extends in a direction perpendicular to the direction in which the lens frame 121 is movable, and the pair of permanent magnets 126 are arranged in parallel to each other. At the central portion of the lens frame 121, another yoke plate 128 is secured. With this structure, a magnetic field represented by line α is generated. Within this magnetic field, provided is a driving coil 129 having a frame-like shape, which is secured to the lens frame 121.

In accordance with the electrical current flowing in the coil 129, a driving force for moving the lens frame 121 in a direction perpendicular to a plane including the optical axes O of the lenses 163 and 164 is generated. Accordingly, by controlling the electrical current flowing through the coil 129, the lens frame 121 can be driven to move in the direction perpendicular to a plane including the optical axes O.

As shown in FIG. 9, a slit 130 is formed on the lens frame 121, and a light emitting device 132 and a position sensitive device (PSD) 133 are provided with the slit 130 located therebetween. The PSD 133 is elongated in the direction where the lens frame 121 moves. Accordingly, output of the PSD 133 represents the position of the lens frame 121.

If the compensation mechanism 120 is used in place of the compensation mechanism 61 in FIG. 7 and the lenses 163 and 164 are positioned such that the optical axes OT intersect the lenses 163 and 164, respectively, the lenses 163 and 164 are movable in a direction perpendicular to the plane including the optical axes OP. Thus, the compensation mechanism 120 functions as the right/left compensation mechanism.

Fourth Embodiment

Compensation mechanisms of a binocular 4000 according to a fourth embodiment of the invention will be described with reference to FIGS. 10 through 13.

Figure 10:
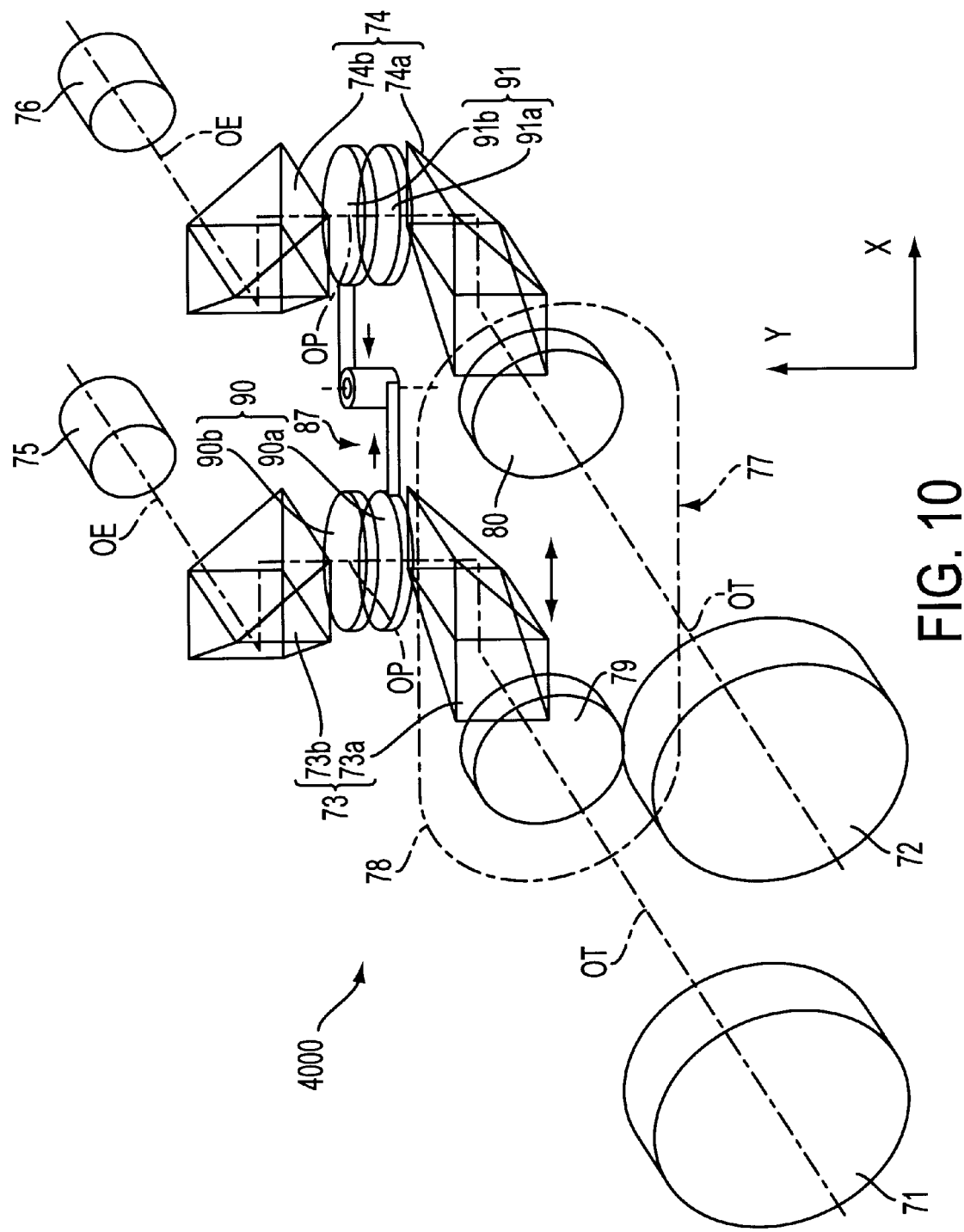
FIG. 10 is a perspective view showing arrangement of optical elements of a binocular according to a fourth embodiment of the invention.

As shown in FIG. 10, the optical system of the binocular is substantially the same as that in the first embodiment except the compensation mechanisms.

As shown in FIG. 10, the binocular according to the fourth embodiment includes right and left objective lenses 71 and 72, right and left erecting optical systems 73 and 74, and right and left eyepiece optical systems 75 and 76.

The erecting optical system 73, which is a type II Porro prism, for right eye is divided into first and second sub prisms 73a and 73b; and the erecting optical system 74, which is also the type II Porro prism, for left eye is also divided into first and second sub prisms 74a and 74b.

The optical axis of the right (or left) eye telescopic optical system includes an optical axis OT which extends from the objective lens 71 (or 72) to the erecting optical system 73 (or 74), and optical axis OP defined between the first and second sub prisms 73a and 73b (or 74a and 74b) and an optical axis OE which extends from the erecting optical system 73 (or 74) to the eyepiece lens 75 (or 76). The axes OT and OE are parallel to each other, and the axis OP is perpendicular to the axes OT and OE.

On the optical axis OT, i.e., at a position between the objective lens 71 (or 72) and the erecting optical system 73 (or 74), an image Ia (or Ib) of the object is reversed as shown in FIG. 16. On the optical axis OP, i.e., at a position between the first and second sub prisms 73a and 73b (or 74a and 74b), an image Ic (or Id) which is rotated by 90 degrees with respect to the image Ia (or Ib) is formed (rotated) by the first sub prism 73a (or 74a) as shown in FIG. 17. By the second sub prism 73b (or 74b), the image is erected, which is observed through the eyepiece lens 75 (or 76).

Figure 11:
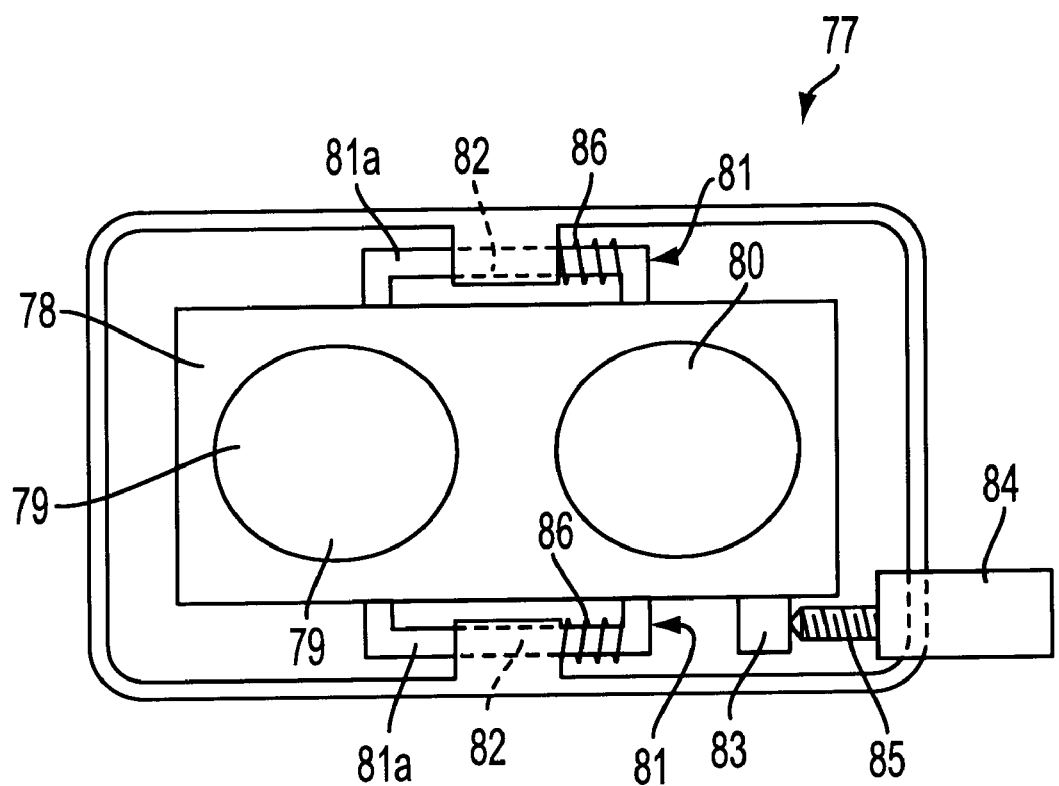
FIG. 11 shows a schematic structure of a right/left compensation mechanism employed in the optical system shown in FIG. 10.

Between the objective lenses 71 and 72, and the first sub prisms 73a and 74a, the right/left compensation mechanism 77 is provided. The right/left compensation mechanism 77 has, as shown in FIG. 11, a rectangular lens frame 78 which holds a pair of compensation lenses 79 and 80 at openings formed thereon. The compensation lenses 79 and 80 are provided to intersect the optical axes OT of the right and left telescopic optical systems. The pair of compensation lenses 79 and 80 are the same lens. At vertical side ends of the lens frame 78, a pair of guide bars 81 and 81 are provided. Linear slide guide bars 81a and 81a are slidably fitted in throughholes formed in a pair of arms 82 and 82 which are formed inside the body of the binocular. With this structure, the lens frame 78 is movable in the X-axis direction in FIG. 10.

On a side surface of the lens frame 78, a projection 83 is formed. On the body of the binocular, an actuator 84 is provided, and a plunger 85 of the actuator 84 abuts the side surface of the projection 83. The actuator 84 is constituted such that when an electrical power is applied thereto, the plunger 85 protrudes/retracts in the right/left direction in FIG. 11. Accordingly, when electrical power is applied to the actuator 84 to make the plunger 85 protrude, the projection 83 is pushed thereby and the lens frame 78 moves toward left-hand side in FIG. 11.

As shown in FIG. 11, coil springs 86 are provided to the linear slide guide bars 81a and 81a to bias the lens frame 78 to move toward the right-hand side in FIG. 11 with respect to the body of the binocular. Thus, when the actuator 84 is driven so that the plunger 85 protrudes, the lens frame 78 moves toward the left-hand side in FIG. 11, while when the actuator 84 is driven so that the plunger 85 retracts, then due to force of the coil springs 86, the projection 83 is kept contacting the plunger 85, i.e., the lens frame 78 moves toward the left-hand side in FIG. 11. Thus, by driving the actuator 84, the lens frame 78 moves in the right/left direction, i.e., a direction perpendicular to a plane including the optical axes OT, and perpendicular to the optical axes OP.

At the position where the compensation mechanism 77 is provided, the direction of movement of the lenses 79 and 80 coincides with the right/left direction of the reversed images Ia and Ib. Therefore, by driving the fram 78 in accordance with the signal indicative of the hand vibration in the right/left direction, trembling of the images due to the hand-vibration in the right/left direction (i.e., X-axis direction) can be compensated.

An up/down compensation mechanism 87 is placed between the first sub prisms 73a and 74a, and the second sub prisms 73b and 74b.

Figure 12:
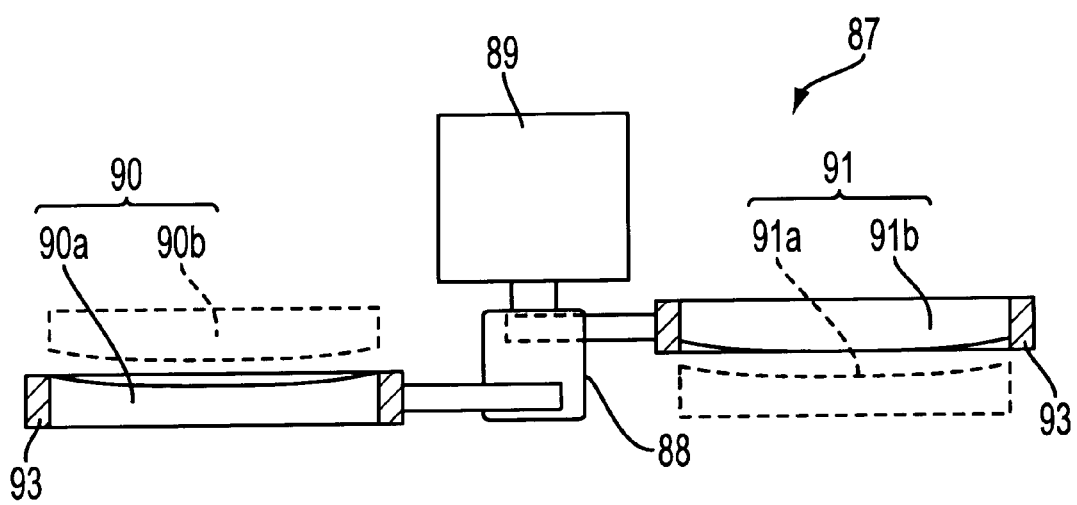
FIG. 12 shows a schematic structure of a up/down compensation mechanism employed in the optical system shown in FIG. 11.
Figure 13:
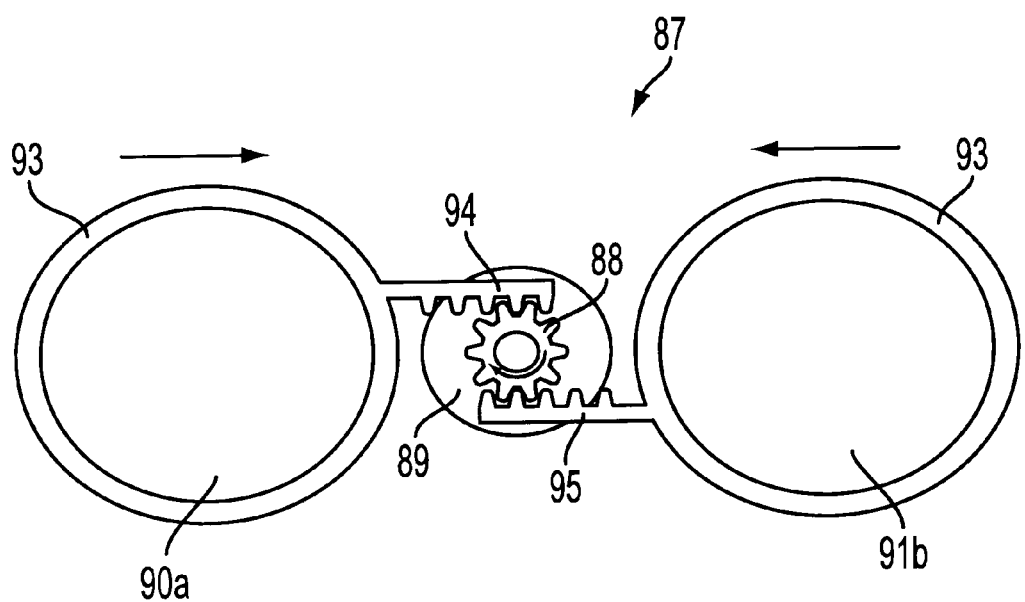
FIG. 13 shows a schematic structure of the up/down compensation mechanism, shown in FIG. 12, viewed in a direction parallel to the optical axis thereof.

The up/down compensation mechanism 87 has, as shown in FIGS. 12 and 13, a motor 89, and to the shaft thereof, a pinion gear 88 is fixed. Further, the up/down compensation mechanism 87 has right and left compensation optical systems 90 and 91. The right compensation optical system 90 includes a negative lens 90a and a positive lens 90b, and the negative lens 90a is held by a frame 92. The left compensation optical system 91 includes a negative lens 91a and a positive lens 91b, and the positive lens 91b is held by a frame 93. It should be noted that, when the negative lens 90a and the positive lens 91b are decentered in the same direction by the same amount, optical path of the light passed through the negative and the positive lenses 90a and 91b are shifted by the same amount, but in the opposite directions. The positive lens 90b and the negative lens 91a are not movable and fixedly positioned inside the binocular such that optical axes thereof coincide with the optical axes OP, respectively.

As shown in FIGS. 12 and 13, from the frame 92, a right rack 94 which engages the pinion gear 88 is projected. Similarly, from the frame 93, a left rack 95 which engages the pinion gear 88 is projected. As shown in FIG. 12, the rack 94 and the rack 95 extend parallely, and are engaged with the pinion gear 88 at opposite sides. When the pinion gear 88 rotates, the frame 92 and the frame 93 move along the X-axis direction. For example, in FIG. 12, when the pinion gear 88 rotates in clockwise direction, the frame 92 and frame 93 move to approach, as indicated by arrows.

Since the negative lens 90a is held by the frame 92, and the positive lens 91b is held by the frame 93, although the frames 92 and 93 move in opposite directions, compensation is made in the same direction, and the direction where compensation is made is a direction parallel to the plane including the optical axes of the lenses 90a and 91b and perpendicular to the optical axes of the lenses 90a and 91b. Further, amounts of compensation made by lenses 90a and 91b, when moved by the same amount, are the same.

Between the objective lenses 71 and 72 and the erecting optical systems 73 and 74, reversed images Ia and Ib are formed. Accordingly, by the compensation mechanism 77, the hand vibration in the right/left direction can be compensated.

At the position where the compensation mechanism 87 is provided, the images Ic and Id have been rotated in the same direction by 90 degrees with respect to the images Ia and Ib. Therefore, the direction of movement of the lenses 91a and 92b coincides with the up/down direction of the images Ic and Id. Therefore, by controlling the motor 89 in accordance with the signal indicative of the hand vibration in the up/down direction, trembling of the images due to the hand-vibration in the up/down direction can be compensated.

It should be noted that the compensation mechanism shown in FIG. 9 may be modified and used instead of the compensation mechanism 77.

Fifth Embodiment

Figure 14:
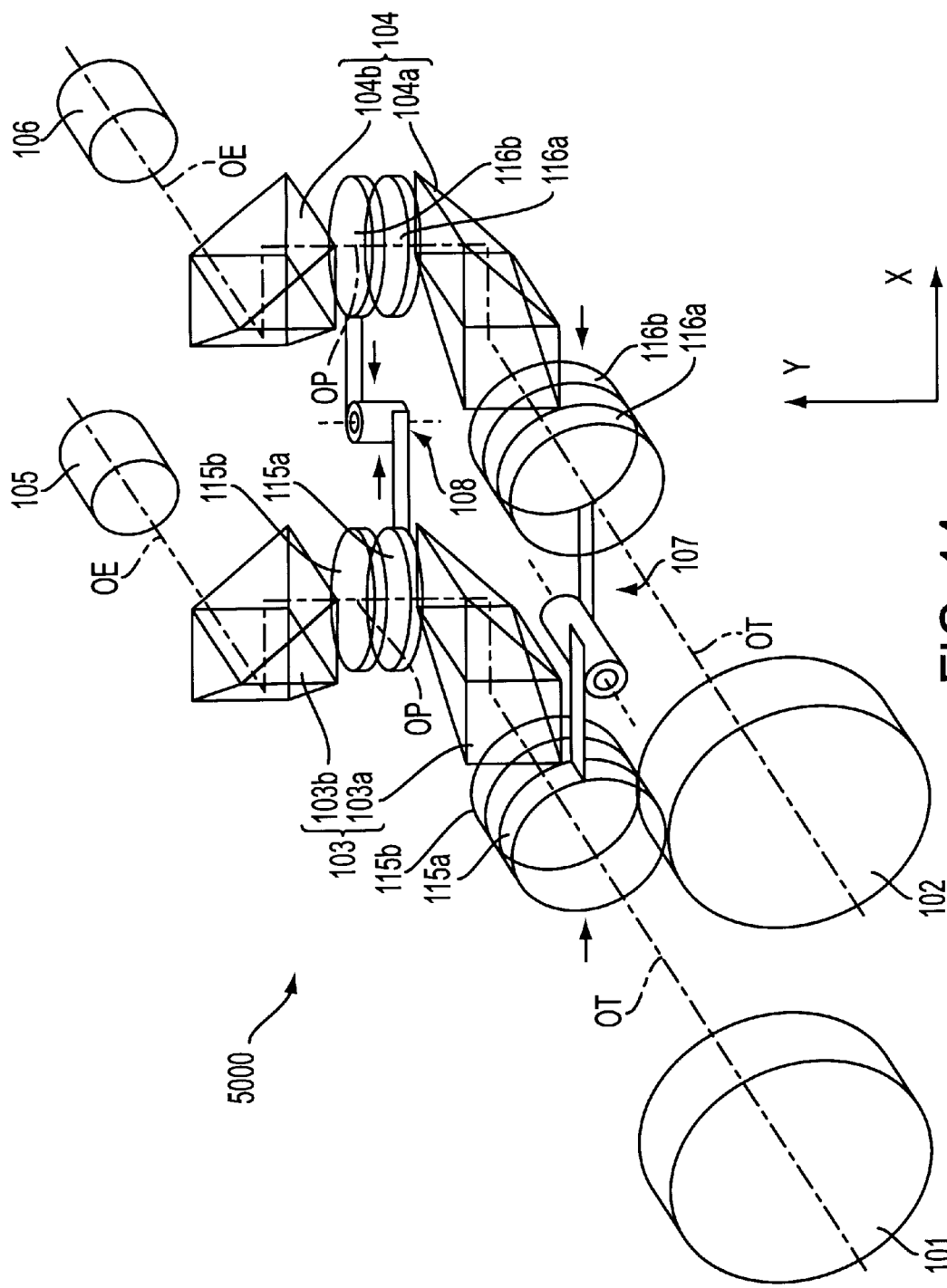
FIG. 14 is a perspective view showing arrangement of optical elements of a binocular according to a fifth embodiment of the invention.

FIG. 14 is a perspective view of the optical system of a binocular 5000 according to a fifth embodiment of the invention.

The optical system shown in FIG. 14 is substantially the same as that in the fourth embodiment except the right/left compensation mechanisms.

As shown in FIG. 14, the binocular according to the fifth embodiment includes right and left objective lenses 101 and 102, right and left erecting optical systems 103 and 104, and right and left eyepiece optical systems 105 and 106.

The erecting optical system 103, which is a type II Porro prism, for right eye is divided into first and second sub prisms 103a and 103b; and the erecting optical system 104, which is also the type II Porro prism, for left eye is also divided into first and second sub prisms 104a and 104b.

The optical axis of the right (or left) eye telescopic optical system includes an optical axis OT which extends from the objective lens 101 (or 102) to the erecting optical system 103 (or 104), and optical axis OP defined between the first and second sub prisms 103a and 103b (or 104a and 104b), and an optical axis OE which extends from the erecting optical system 103 (or 104) to the eyepiece lens 105 (or 106). The axes OT and OE are parallel to each other, and the axis OP is perpendicular to the axes OT and OE.

On the optical axis OT, i.e., at a position between the objective lens 101 (or 102) and the erecting optical system 103 (or 104), an image Ia (or Ib) of the object is reversed as shown in FIG. 16. On the optical axis OP, i.e., at a position between the first and second sub prisms 103a and 103b (or 104a and 104b), an image Ic (or Id) which is rotated by 90 degrees with respect to the image Ia (or Ib) is formed (rotated) by the first sub prism 103a (or 104a) as shown in FIG. 17. By the second sub prism 103b (or 104b), the image is erected, which is observed through the eyepiece lens 105 (or 106).

In the fifth embodiment, a right/left compensation mechanism 107 is placed between the objective lenses 101 and 102, and the erecting optical systems 103 and 104. Between the first sub prisms 103a and 104a, and the second sub prisms 103b and 104b, an up/down compensation mechanism 108 is provided. The right/left compensation mechanism 107 and the up/down compensation mechanism 108 have the same structure as the compensation mechanism 87 employed in the fourth embodiment.

Figure 15:
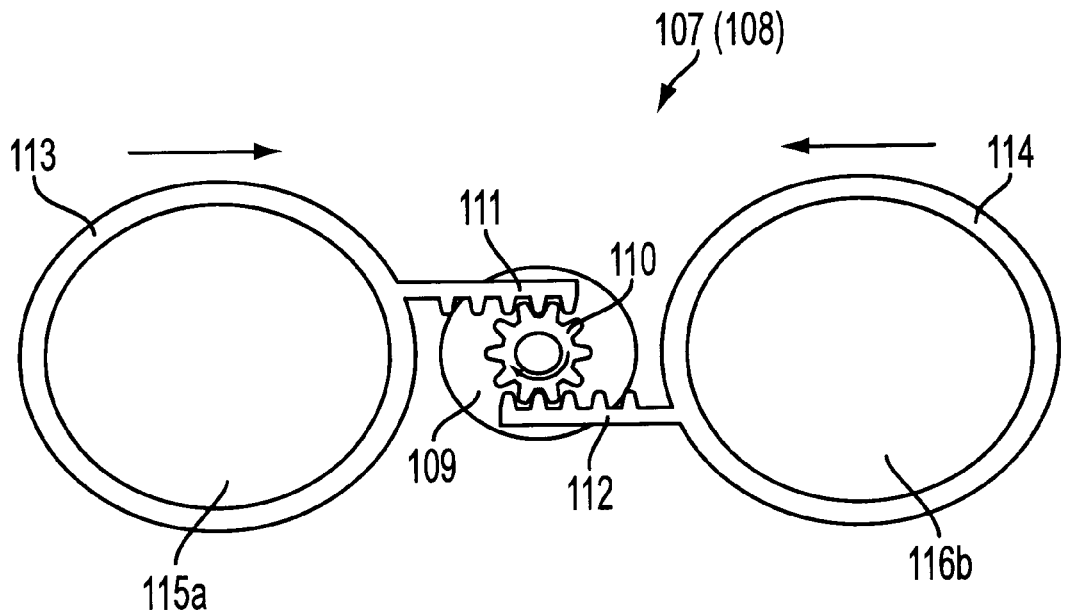
FIG. 15 shows a schematic structure of a hand-vibration compensation mechanism employed in the optical system shown in FIG. 14.

As shown in FIG. 15, the compensation mechanism 107 (or 108) has a motor 109, to the shaft thereof, a pinion gear 110 is fixed. Further, the compensation mechanism 107 (or 108) has right and left compensation optical systems. The right compensation optical system includes a negative lens 115a and a positive lens 115b, and the negative lens 115a is held by a frame 113. The left compensation optical system includes a negative lens 116a and a positive lens 116b, and the positive lens 116b is held by a frame 114. It should be noted that when the negative lens 115a and the positive lens 116b are decentered in the same direction by the same amount, optical path of the light passed through the negative and the positive lenses 115a and 116b are shifted by the same amount, but in the opposite directions. The positive lens 115b and the negative lens 116a are not movable and fixedly positioned inside the binocular such that optical axes thereof coincide with the optical axes OT, respectively.

As shown in FIG. 15, from the frame 113, a right rack 111 which engages the pinion gear 110 is projected. Similarly, from the frame 114, a left rack 112 which engages the pinion gear 110 is projected. As shown in FIG. 15, the rack 111 and the rack 112 extend parallely, and are engaged with the pinion gear 110 at opposite sides. When the pinion gear 110 rotates, the frame 113 and the frame 114 move away from or closer to it each other. For example, in FIG. 15, when the pinion gear 110 rotates in the clockwise direction, the frame 113 and frame 1143 move to approach, as indicated by arrows.

Since the negative lens 115a is held by the frame 113, and the positive lens 116b is held by the frame 114, although the frames 113 and 114 move in opposite directions, compensation is made in the same direction, and the direction where compensation is made is a direction parallel to the plane including the optical axes of the lenses 115a and 116b and perpendicular to the optical axes of the lenses 115a and 116b. Further, amounts of compensation made by lenses 115a and 116b, when moved by the same amount, are the same.

Between the objective lenses 101 and 102 and the erecting optical systems 103 and 104, reversed images Ia and Ib are formed. Accordingly, by the compensation mechanism 107, the hand vibration in the right/left direction can be compensated.

Between the first sub prisms 103a and 104a, and the second sub prisms 103b and 104b, the images Ic and Id are rotated by 90 degrees, in the same direction, with respect to the images Ia and Ib. Therefore, by the compensation mechanism 108, it is possible to compensate the hand vibration in the up/down direction.

A control system similar to that shown in FIG. 3 or any other suitable control systems can easily be modified to be applicable to the third embodiment. Since the control system has been described above with reference to FIG. 3, description and drawing of the control system applicable to the third embodiment will be omitted.

Some of the above-described compensation mechanisms can be modified to be applicable to an observation optical system such as a telescope having a single telescopic optical system including the objective lens, erecting optical system and the eyepiece lens.

The present disclosure relates to the subject matter contained in Japanese Patent Application No. HEI 09-331659, filed on Dec. 2, 1997, which is expressly incorporated herein by reference in its entirety.

What is claimed is:

1. An observation optical system having a front portion through which light enters, the optical system comprising:

at least one telescopic optical system having a plurality of optical elements, said plurality of optical elements being arranged such that said observation optical system has a horizontally extending first optical axis passing through said front portion, and a vertically extending second optical axis when said observing optical system is held horizontally by a user;

a first compensation optical system that is moved to shift an optical path of light passed through said first compensation optical system to compensate trembling of image due to hand vibration applied to said observation optical system in a horizontal direction when said observation optical system is held horizontally; and a second compensation optical system that is moved to shift an optical path of light passed through said second compensation optical system to compensate trembling of image due to hand vibration applied to said observation optical system in a vertical direction when said observation optical system is held horizontally, said first compensation optical systems being arranged such that said first optical axis intersects said first compensation optical system, said second compensation optical system being arranged to such that said second optical axis intersects said second compensation optical system, said second compensation optical system comprising a rotatable member which is rotatable about an axis extending parallel to said second optical axis, said rotatable member being equally balanced at said second optical axis.

2. The observation optical system according to claim 1, wherein said plurality of optical elements include a pair of prisms constituting an erecting optical system, said pair of prisms respectively having two reflection surfaces, said pair of prisms being arranged spaced apart along said second optical axis, said second compensation optical systems being arranged between said pair of prisms.

3. An observation optical system having a front portion through which light enters, the optical system comprising:

at least one telescopic optical system having a plurality of optical elements, said plurality of optical elements being arranged such that said observation optical system has a horizontally extending first optical axis passing through said front portion, and a vertically extending second optical axis when said observing optical system is held horizontally by a user;

a first compensation optical system that is moved to shift an optical path of light passed through said first compensation optical system to compensate trembling of image due to hand vibration applied to said observation optical system in a horizontal direction when said observation optical system is held horizontally; and a second compensation optical system that is moved to shift an optical path of light passed through said second compensation optical system to compensate trembling of image due to hand vibration applied to said observation optical system in a vertical direction when said observation optical system is held horizontally, said second compensation optical system being arranged such that said second optical axis intersects said second compensation system, said first compensation optical system being arranged such that said first optical axis intersects said first compensation optical system, said first compensation optical system being movable in a direction perpendicular to both of said first and said second optical axis.

4. The observation optical system according to claim 3, wherein said plurality of optical elements include a pair of prisms constituting an erecting optical system, said pair of prisms respectively having two reflection surfaces, said pair of prisms being arranged spaced apart along said first optical axis, said first compensation optical systems being arranged between said pair of prisms.

5. A binocular having a front portion through which light enters, the binocular having a pair of telescopic optical systems, each of said telescopic optical systems comprising:

a plurality of optical elements, said plurality of optical elements being arranged such that said telescopic optical system has a horizontally extending first optical axis passing through said front portion, and a vertically extending second optical axis when said binocular is held horizontally by a user;

a first compensation optical system that is moved to shift an optical path of light traveling along second optical axis to compensate trembling of image due to hand vibration applied to said binocular in a horizontal direction when said binocular is held horizontally; and a second compensation optical system that is moved to shift an optical path of light traveling along said first optical axis to compensate trembling of image due to hand vibration applied to said binocular in a vertical direction when said binocular is held horizontally, said second compensation optical system including a rotatable member which is rotatable about an axis extending parallel to said second optical axis, said rotatable member being equally balanced at said axis.

6. The binocular according to claim 5, wherein said second compensation optical system comprises:

a rotatable arm which is rotatable about a rotational axis defined at a center of the said first optical axes of both of said telescopic optical systems;

a pair of compensation lenses held at both ends of said rotatable arm, said pair of compensation lenses having opposite powers, said first optical axes intersecting said pair of lenses of both of said telescopic optical systems; and an actuator that rotates said rotatable arm in accordance with hand vibration applied to said binocular in said vertical direction.

7. The binocular according to claim 5, wherein said plurality of optical elements include first and second prisms constituting an erecting optical system, said first and second prisms respectively having two reflection surfaces, said first and second prisms being arranged spaced apart along said second optical axis, said first compensation optical systems being arranged between said first and second prisms.

8. The binocular according to claim 7, said first compensation optical system being constituted to be another rotatable member which is rotatable about another axis extending parallel to said second optical axis, said another rotatable member being equally balanced at said another axis.

9. The binocular according to claim 8, wherein said first prisms of said telescopic optical systems are arranged such that images are rotated by 90 degrees in the same direction.

10. The binocular according to claim 8, wherein said first prisms of said telescopic optical systems are arranged such that images are rotated by 90 degrees in opposite directions.

11. The binocular according to claim 7, said first compensation optical system being movable in a direction perpendicular to both of said first and said second optical axis.

12. The binocular according to claim 11, wherein said first compensation optical system comprises:

a movable frame which is movable in a direction parallel to said first optical axis of each of said telescopic optical systems;

a pair of compensation lenses held by said movable frame, said second optical axis intersecting each said pair of compensation lenses; and an actuator that moves said movable frame in accordance with hand vibration applied to said binocular in said horizontal direction.

13. The binocular according to claim 11, wherein said first compensation optical system comprises:

a movable frame which is movable in a direction parallel to said first optical axes of both of said telescopic optical systems;

a pair of compensation lenses held by said movable frame, each of said second optical axis intersecting each of said pair of compensation lenses;

a magnet field generating system which generates a magnet field around said movable frame; and a coil fixed to said movable frame,
 wherein, when electrical current flows through said coil, said movable frame is driven to move in said direction parallel to said first optical axes.

14. The binocular according to claim 5, wherein said first and second compensation optical systems have the same structure.

15. A binocular having a front portion through which light enters, the binocular having a pair of telescopic optical systems, each of said telescopic optical systems comprising:

a plurality of optical elements, said plurality of optical elements being arranged such that said telescopic optical system has a horizontally extending first optical axis passing through said front portion, and a vertically extending second optical axis when said binocular is held horizontally by a user;

a first compensation optical system that is moved to shift an optical path of light traveling along said first optical axis to compensate trembling of image due to hand vibration applied to said binocular in a horizontal direction when said binocular is held horizontally, said first compensation optical system being movable in a direction perpendicular to both of said first and said second optical axis; and a second compensation optical system that is moved to shift an optical path of light traveling along said second optical axis to compensate trembling of image due to hand vibration applied to said binocular in a vertical direction when said binocular is held horizontally.

16. The binocular according to claim 15, wherein said first compensation optical system comprises:

a movable frame which is movable in a direction perpendicular to both of said first optical axis and said second optical axis;

a pair of compensation lenses held by said movable frame, said first optical axis intersecting each of said pair of compensation lenses; and an actuator that moves said movable frame in accordance with the hand vibration applied to said binocular in said horizontal direction.

17. The binocular according to claim 15, wherein said first compensation optical system comprises:

a pair of frame members respectively holding compensation lenses, said first optical axis of each of said telescopic optical systems intersecting each of said pair of compensation lenses, each of said frame members being movable in a direction perpendicular to both of said first and second optical axes of said telescopic optical systems; and an actuator that moves said pair-of frame members simultaneously in opposite directions in accordance with the hand vibration applied to said binocular in said horizontal direction.

18. The binocular according to claim 15, wherein said plurality of optical elements include first and second prisms constituting an erecting optical system, said first and second prisms respectively having two reflection surfaces, said first and second prisms being arranged spaced apart along said second optical axis, said second compensation optical systems being arranged between said first and second prisms.

19. The binocular according to claim 18, said second compensation optical system being movable in a direction perpendicular to both of said first and said second optical axis.

20. The binocular according to claim 19, wherein said second compensation optical system comprises:

a pair of frame members respectively holding compensation lenses, said second optical axis of each of said telescopic optical systems intersecting each of said pair of compensation lenses, each of said frame members being movable in a direction perpendicular to both of said first and second optical axes of said telescopic optical systems; and an actuator that moves said pair of frame members simultaneously in opposite directions in accordance with the hand vibration applied to said binocular in said vertical direction.

21. The binocular according to claim 15, wherein said first and second compensation optical systems have the same structure.

* * * * *